(12) United States Patent
Awadh et al.

(10) Patent No.: US 11,613,479 B2
(45) Date of Patent: Mar. 28, 2023

(54) GRAPHENE REINFORCED POLYSTYRENE COMPOSITE FOR SEPARATION OF NONPOLAR COMPOUNDS FROM WATER

(71) Applicant: King Fahd University of Petroleum and Minerals, Dhahran (SA)

(72) Inventors: Tawfik Abdo Saleh Awadh, Dhahran (SA); Nadeem Baig, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 681 days.

(21) Appl. No.: 16/521,202

(22) Filed: Jul. 24, 2019

(65) Prior Publication Data

US 2021/0024378 A1    Jan. 28, 2021

(51) Int. Cl.

| C02F 1/28 | (2006.01) |
|---|---|
| B01J 20/26 | (2006.01) |
| B01J 20/28 | (2006.01) |
| B01J 20/32 | (2006.01) |
| B01J 20/20 | (2006.01) |
| C02F 101/32 | (2006.01) |

(52) U.S. Cl.
CPC .............. *C02F 1/288* (2013.01); *B01J 20/20* (2013.01); *B01J 20/261* (2013.01); *B01J 20/262* (2013.01); *B01J 20/28045* (2013.01); *B01J 20/28059* (2013.01); *B01J 20/28083* (2013.01); *B01J 20/28085* (2013.01); *B01J 20/324* (2013.01); *B01J 20/327* (2013.01); *B01J 20/3212* (2013.01); *B01J 20/3225* (2013.01); *C02F 1/281* (2013.01); *C02F 1/285* (2013.01); *C02F 2101/32* (2013.01); *C02F 2303/16* (2013.01)

(58) Field of Classification Search
None
See application file for complete search history.

(56) References Cited

U.S. PATENT DOCUMENTS

| 9,050,605 B2* | 6/2015 | Guo .......................... B03C 1/00 |
| 2016/0019995 A1* | 1/2016 | Zhamu ................... C01B 32/182 |
| | | 427/122 |
| 2019/0091950 A1 | 3/2019 | Hernandez Rueda et al. |

FOREIGN PATENT DOCUMENTS

| CN | 101722656 B | 8/2012 |
| CN | 108912286 A | 11/2018 |
| EP | 2 014 708 A1 | 1/2009 |

(Continued)

OTHER PUBLICATIONS

Baig, et al. ; Natural-Light-Initiated 3D Macro Zigzag Architecture of Graphene-Reinforced Polystyrene for Gravity-Driven Oil and Water Separation ; Global Challenges, 2 ; 2018 ; 9 Pages.

(Continued)

*Primary Examiner* — Kara M Peo
(74) *Attorney, Agent, or Firm* — Oblon, McClelland, Maier & Neustadt, L.L.P.

(57) ABSTRACT

A composite material of polyurethane foam having a layer of reduced graphene oxide and polystyrene is described. This composite material may be made by contacting a polyurethane foam with a suspension of reduced graphene oxide, drying, and then irradiating in the presence of styrene vapor. The composite material has a hydrophobic surface that may be exploited for separating a nonpolar phase, such as oil, from an aqueous solution.

6 Claims, 19 Drawing Sheets

(56) References Cited

FOREIGN PATENT DOCUMENTS

| KR | 10-1410826 | 6/2014 |
| WO | 2018/040606 A1 | 3/2018 |

OTHER PUBLICATIONS

Baig, et al. ; Initiator-Free Natural Light-Driven Vapor Phase Synthesis of a Porous Network of 3D Polystyrene Branched Carbon Nano_ber Grafted Polyurethane for Hexane /Water Separation ; ChemistrySelect, vol. 3, Issue 28 ; Jul. 30, 2018 ; pp. 8312-8318 ; 7 Pages.

Baig, et al. ; Superhydrophobic and superoleophilic carbon nanofiber grafted polyurethane for oil-water separation ; Process Safety and Environmental Protection, vol. 123 ; pp. 327-334 ; Mar. 2019 ; Abstract Only ;2 Pages.

Wang, et al. ; Toward Superhydrophobic/Superoleophilic Materials for Separation of Oil/Water Mixtures andWater-in-Oil Emulsions Using Phase Inversion Methods ; MDPI coatings ; Nov. 11, 2018 ; 11 Pages.

Ghosh, et al. ; Multi-walled carbon nanotubes reinforced interpenetrating polymer network with ultrafast self-healing and anti-icing attributes ; Journal of Colloid and Interface Science, vol. 540 ; pp. 247-257 ; Mar. 22, 2019 ; Abstract Only ; 2 Pages.

Lei, et al. ; Multiphase surface growth of hydrophobic ZIF-8 on melamine sponge for excellent oil/water separation and effective catalysis in a Knoevenagel reaction† ; Journal of Materials Chemistry A ; Jan. 22, 2018 ; 6 Pages.

Yang, et al. ; 3D-Printed Biomimetic Super-Hydrophobic Structure for Microdroplet Manipulation and Oil/Water Separation ; Advanced Materials Communication ; 2018 ; 11 Pages.

Wang, et al. ; Facile Approach in Fabricating Superhydrophobic and Superoleophilic Surface for Water and Oil Mixture Separation ; Applied Materials and Interfaces, vol. 1, No. 11 ; pp. 2613-2617 ; Nov. 5, 2019 ; 5 Pages.

Zhang, et al. ; Polyester Materials with Superwetting Silicone Nanofilaments for Oil/Water Separation and Selective Oil Absorption ; Materials Views, Advanced Functional Materials; pp. 4699-4704 ; 2011 ; 6 Pages.

Gao, et al. ; Facile preparation of polymer microspheres and fibers with a hollow core and porous shell for oil adsorption and oil/water separation ; Applied Surface Science 439 ; pp. 394-404 ; 2018 ; Jan. 8, 2018 ; 11 Pages.

Wang, et al. ; Polydopamine nanocluster decorated electrospun nanofibrous membrane for separation of oil/water emulsions ; Journal of Membrane Sciences 547 ; pp. 156-162 ; 2018 ; 7 Pages.

\* cited by examiner

Step 1: Vaporization

Step 2: Polymerization

GRAPHENE REINFORCED POLYSTYRENE COMPOSITE FOR SEPARATION OF NONPOLAR COMPOUNDS FROM WATER

STATEMENT REGARDING PRIOR DISCLOSURES BY THE INVENTORS

Aspects of this technology are described in the articles, Baig, N. and Saleh, T. A., "Natural-Light-Initiated 3D Macro Zigzag Architecture of Graphene-Reinforced Polystyrene for Gravity-Driven Oil and Water Separation" *Global Challenges*, 2018, 2, 1800040, DOI: 10.1002/gch2.201800040; and Baig, N. and Saleh, T. A., "Initiator-Free Natural Light-Driven Vapor Phase Synthesis of a Porous Network of 3D Polystyrene Branched Carbon Nanofiber Grafted Polyurethane for Hexane/Water Separation," *Chemistry Select* 2018, 3, 8312, DOI: 10.1002/slct.201801549. Each article is incorporated herein by reference in its entirety.

BACKGROUND OF THE INVENTION

Technical Field

The present invention relates to a composite of polystyrene grafted onto reduced graphene oxide layered on a polyurethane foam support, a method of making the composite, and a method of using the composite to separate nonpolar components from contaminated water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Rapid industrialization and a fast-growing world population have resulted in a high demand for energy. Oil spillage incidents have become common due to the frequent oil movements across the world to supply these high energy demands. The Deep-water Horizon oil spill (2010) in the Gulf of Mexico was considered to be a major oil spillage accident in marine water. Five million barrels of oil were released, and the deaths of 11 people were reported due to this accident. Another incident in North Dakota, USA in 2016 caused the release of 4,200 barrels of oil. See Z. Zhang, et al., *Sci. Rep.* 2018, 8, 3869. Industrial wastes may also contain large quantities of oil which may cause severe water pollution if released into the environment. Oil pollution is a critical threat to living organisms and their ecosystem. See Y. Li, et al., *Glob. Challenges* 2017, 1, 1600014; and N. Cao, et al., *Chem. Eng.* 1 2017, 307, 319. However, oil removal from water is a major challenge to maintain a clean aquatic environment. See C.-F. Wang, et al., *Sci. Rep.* 2017, 7, 43053; and Y. S. You, et al., *Sci. Rep.* 2017, 7, 15345.

Oil-water separation is of great interest to the researcher due to its economic, social, and environmental significance. See Z. Xue, et al., *J. Mater. Chem. A* 2014, 2, 2445; and M. A. Riaz, et al., *Environ. Sci. Pollut. Res.* 2017, 24, 27731. One of the crucial factors in the performance of the materials used for oil and water separation is their wettability. See J. Zhang, et al., *Adv. Funct. Mater.* 2011, 21, 4699. Superhydrophobic surfaces can be prepared through layer by layer assembly, coating, dip-coating, drop-coating, chemical vapor deposition, and a sol-gel method. See L. Zhang, et al., *Sci. Rep.* 2013, 3, 2326; D. D. Nguyen, et al., *Energy Environ. Sci.* 2012, 5, 7908; M. Zhang, et al., *Carbohydr. Polym.* 2013, 97, 59; H. Liu, et al., *Langmuir* 2004, 20, 5659; Z. Zhang, et al., *Sci. Rep.* 2018, 8, 3869; and K. Tadanaga, et al., *Chem. Mater.* 2000, 12, 590. Various supports have been used to develop superhydrophobic surfaces including mesh, sponges, foams, and fabrics. See Z. Xue, et al., *Adv. Mater.* 2011, 23, 4270; N. Chen, et al., *ACS Nano* 2013, 7, 6875; X. Zhang, et al., *Adv. Funct. Mater.* 2013, 23, 2881; and B. Wang, et al., *ACS Appl. Mater. Interfaces* 2013, 5, 1827. The hydrophobic surfaces are generated using a range of materials such as metal, metal oxide nanoparticles, polymers, and carbon nanomaterial. See B. Wang, et al., *ACS Appl. Mater. Interfaces* 2013, 5, 1827; C. R. Crick, et al., *J. Mater. Chem. A* 2013, 1, 5943; C. Liu, et al., *Colloids Surfaces A Physicochem. Eng. Asp.* 2015, 468, 10; and X. Gui, et al., *ACS Appl. Mater. Interfaces* 2013, 5, 5845. Recently, 2D graphene and its derivatives have received extraordinary attention due to their unique physicochemical properties. Graphene and its derivatives are extensively used to improve the chemical, electrical, mechanical, and thermal behavior of materials. See Z. Xu, et al., *Glob. Challenges* 2017, 1, 1700050; Y. Shudo, et al., *Glob. Challenges* 2017, 1, 1700054; X. Liao, et al., *Prog. Org. Coatings* 2018, 115, 172; Y.-J. Wan, et al., *Carbon N. Y.* 2014, 69, 467; and N. Baig, A.-N. Kawde, *Anal. Methods* 2015, 7, 9535. Graphene, apart from its excellent electrochemical properties, also possesses remarkable hydrophobic properties. See D. D. Nguyen, et al., *Energy Environ. Sci.* 2012, 5, 7908; and N. Baig, T. A. Saleh, *Microchim. Acta* 2018, 185, 283. The hydrophobic behavior of graphene has been exploited to fabricate hydrophobic materials for the separation of oil from water. See D. D. Nguyen, et al., *Energy Environ. Sci.* 2012, 5, 7908; and Y. Luo, et al., *Sci. Rep.* 2017, 7, 1. For example, graphene-based hydrophobic foam can be synthesized by a simple dip-coating method using a 3D polymer skeleton. Graphene oxide was used as a precursor to obtain graphene, and the resulting graphene coated foam displayed good hydrophobicity. See C. Wu, et al., *Adv. Mater.* 2013, 25, 5658. Spongy graphene has been obtained without any support through the hydrothermal method by enclosing graphene oxide into a sealed reactor of the desired shape and subjecting the graphene oxide to 180° C. for 24 hours. The obtained graphene gel was freeze-dried for 48 hours to obtain spongy graphene. The spongy graphene had a high tendency for petroleum absorption, as well as fat. See H. Bi, et al., *Adv. Funct. Mater.* 2012, 22, 4421. In another study, a magnetic foam was obtained by the combination of magnetic nanoparticles ($Fe_3O_4$) and graphene/reduced graphene oxide. The introduction of magnetic properties into the foam facilitated the facile movement and removal of the foam after oil absorption. See C. Liu, et al., *Colloids Surfaces A Physicochem. Eng. Asp.* 2015, 468, 10. Similarly, a magnetic nanoparticle functionalized free standing reduced graphene oxide foam was synthesized by the hydrothermal method. See A. Subrati, et al., *Ind. Eng. Chem. Res.* 2017, 56, 6945.

In most of the cases reduced graphene oxide is obtained from graphene oxide. The synthesis and the handling of the graphene oxide are straight-forward and cost-effective, and graphene oxide can be produced on a large scale. See D. C. Marcano, et al., *ACS Nano* 2010, 4, 4806. Graphene oxide has a strong hydrophilic character, and its hydrophobicity is increased by reducing it. See A. Gholampour, et al., *ACS Appl. Mater. Interfaces* 2017, 9, 43275. However, the graphene oxide cannot be fully reduced, and some oxygen functionalities still remain on the surface of the reduced graphene oxide, which prevents complete hydrophobicity of the reduced graphene oxide. See N. Baig, T. A. Saleh, *Microchim. Acta* 2018, 185, 283. The coating of the reduced graphene on a 3D support also faces the issue of long-term stability. The reduced graphene oxide coating can deteriorate after multiple uses. Moreover, the process adapted for the production of a hydrophobic surface is either very costly or tedious, or it is difficult to maintain a stable surface for a long time. Another challenge is to prepare hydrophobic or hydrophilic surfaces by using readily available materials where a synthesis process is possible for the large-scale production of the hydrophobic materials. There is a need to introduce an efficient hydrophobic material which can be synthesized through a cost-effective process with a methodology that can be easily adapted for large-scale production.

In view of the foregoing, a porous 3D network of polystyrene and graphene was synthesized through a green methodology. The porous 3D network displayed excellent mechanical stability and superhydrophobic behavior. The porous 3D network was formed using a polymerization process that was carried out under natural sunlight which provided a green, non-hazardous, and cost-effective route for the bulk production of the superhydrophobic material with a uniform and controlled morphology. A zigzag shaped growth of polystyrene on the surface of r-GO grafted polyurethane of the porous 3D network was observed to provide a greater surface area for the efficient separation of oil from water.

BRIEF SUMMARY OF THE INVENTION

According to a first aspect, the present disclosure relates to a composite material, comprising a polyurethane foam coated with a layer of reduced graphene oxide (r-GO), and a layer of polystyrene in contact with the layer of r-GO. The composite material has pore diameters in a range of 50-500 µm. In one embodiment, the composite material has an apparent contact angle with water in a range of 130°-170°.

In one embodiment, the composite material has an adsorption pore size in a range of 25-50 Å.

In one embodiment, the composite material has a BET surface area in a range of 50-100 $m^2/g$, In one embodiment, at least 70% of a total surface of the polyurethane foam is coated with the layer of r-GO.

In one embodiment, at least 70% of a total exposed surface of the composite material is the layer of polystyrene.

According to a second aspect, the present disclosure relates to a method of making the composite material of the first aspect, comprising the steps of contacting a polyurethane foam with a suspension of r-GO in an alcohol to produce a wet scaffold, drying the wet scaffold to produce a r-GO grafted polyurethane composite, and irradiating the r-GO grafted polyurethane composite in the presence of a styrene vapor to produce the composite material.

In one embodiment, the method further comprises the step of contacting the composite material with toluene after the irradiating.

In one embodiment, the polyurethane foam has a BET surface area in a range of 5-20 $m^2/g$.

In one embodiment, the r-GO grafted polyurethane composite has a BET surface area in a range of 5-20 $m^2/g$.

In one embodiment, the r-GO is present in the suspension at a concentration of 0.1-5 mg/mL.

In one embodiment, the contacting is done for a period of 3-60 min.

In one embodiment, the drying is at a temperature of 50-80° C. for a period of 6-24 h.

In one embodiment, the irradiating involves exposing the r-GO grafted polyurethane composite to sunlight.

According to a third aspect, the present disclosure relates to a method of separating a nonpolar compound from an aqueous solution in a mixture. This method involves contacting the mixture with the composite material of the first aspect. The composite material adsorbs 8-25 times its weight of the nonpolar compound.

In one embodiment, the nonpolar compound is at least one selected from the group consisting of hexane, heptane, toluene, xylene, and a petroleum-derived liquid.

In one embodiment, the composite material adsorbs less than 20% of its weight of the aqueous solution.

In one embodiment, the contacting involves filtering the mixture through the composite material.

In one embodiment, the method further comprises the step of compressing the composite material after the contacting to produce a discharged composite material, and reusing the discharged composite material.

In one embodiment, the discharged composite material comprises at least 90 wt % r-GO relative to a weight of r-GO in the composite material.

In one embodiment, the discharged composite material comprises at least 90 wt % polystyrene relative to a weight of polystyrene in the composite material.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
FIG. 1 is a diagram showing the role of sunlight in evaporation and polymerization of styrene.
Figure 1:
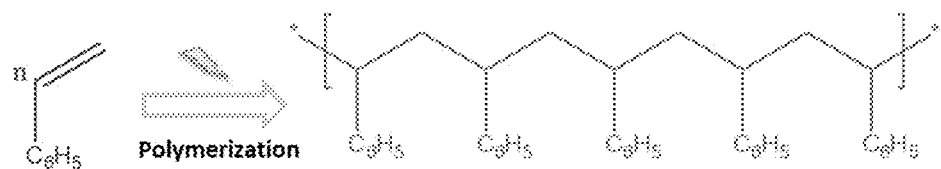

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

For polygonal shapes, the term "diameter", as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2.6H_2O$, and any other hydrated forms or mixtures. $CuCl_2$ includes both anhydrous $CuCl_2$ and $CuCl_2.2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a composite material, comprising a polyurethane foam coated with a layer of reduced graphene oxide (r-GO), and a layer of polystyrene in contact with the layer of r-GO.

Figure 4A:
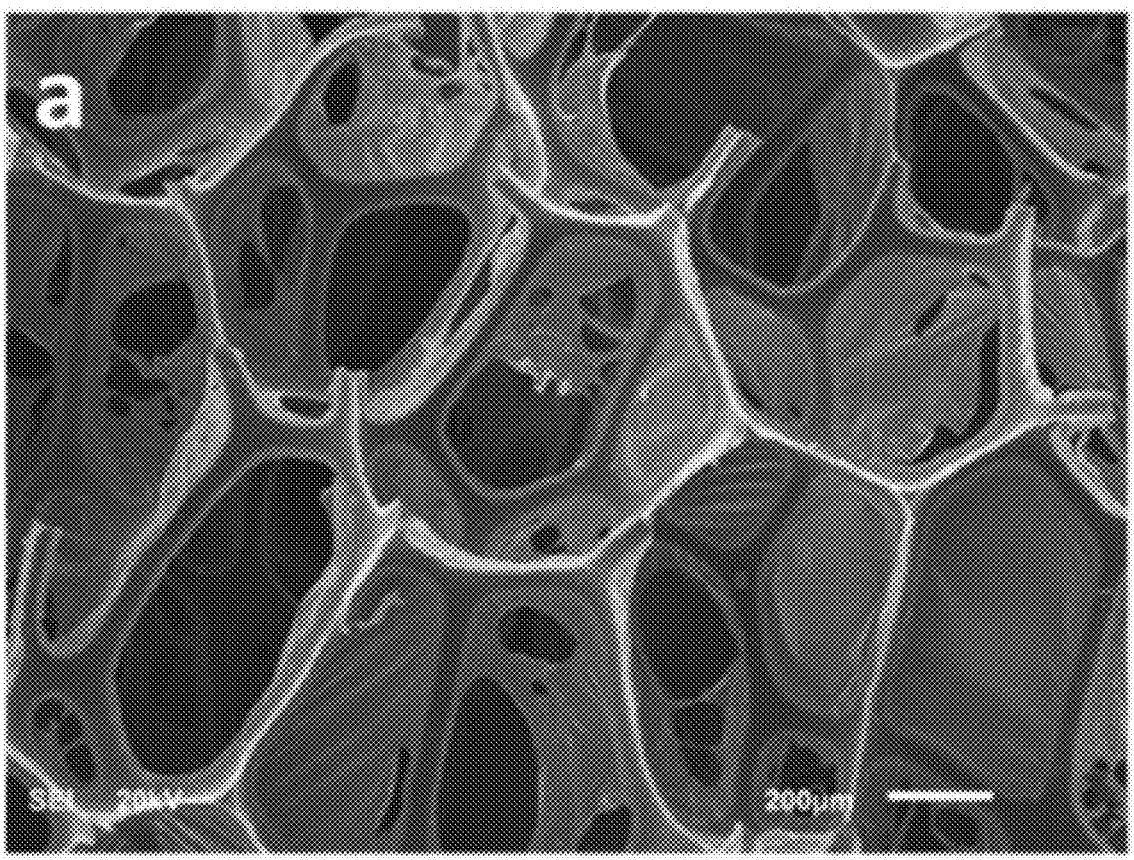
FIG. 4A is a SEM image of PU, scale bar 200 µm.
Figure 4B:
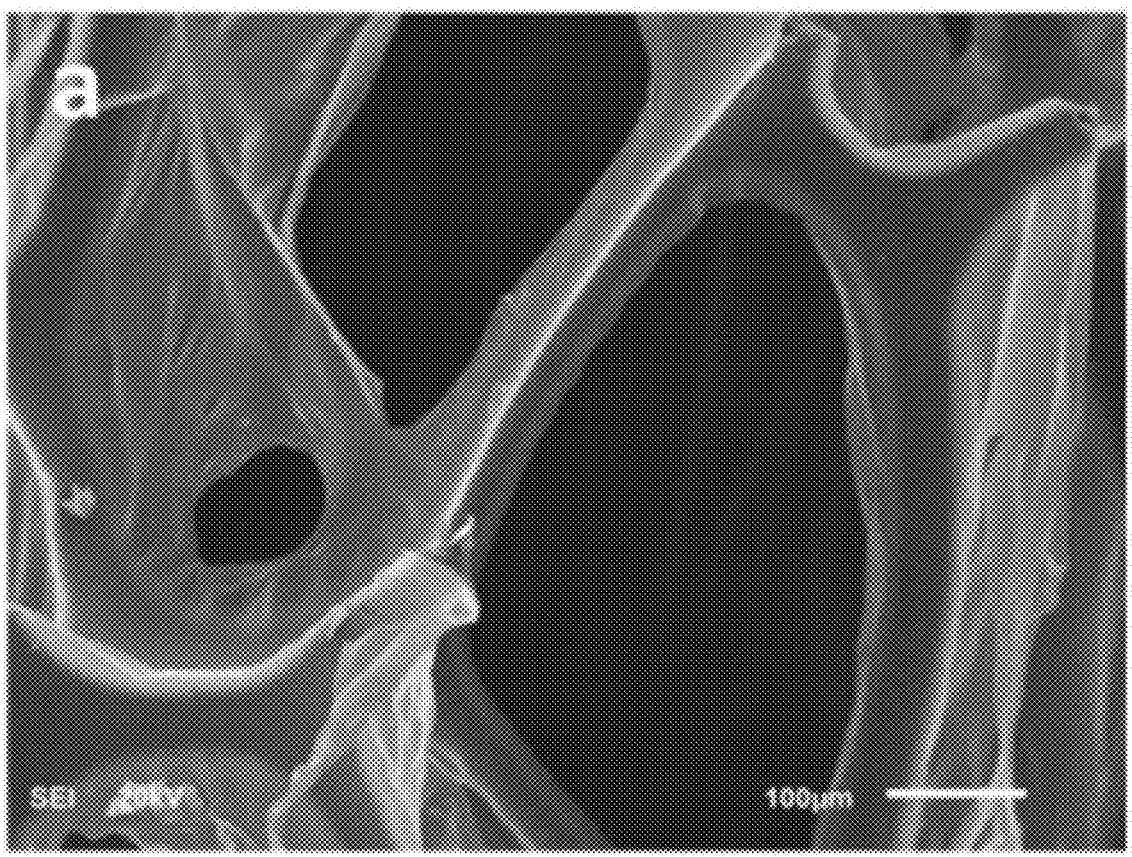
FIG. 4B is a higher magnification SEM image of PU, scale bar 100 µm.
Figure 4C:
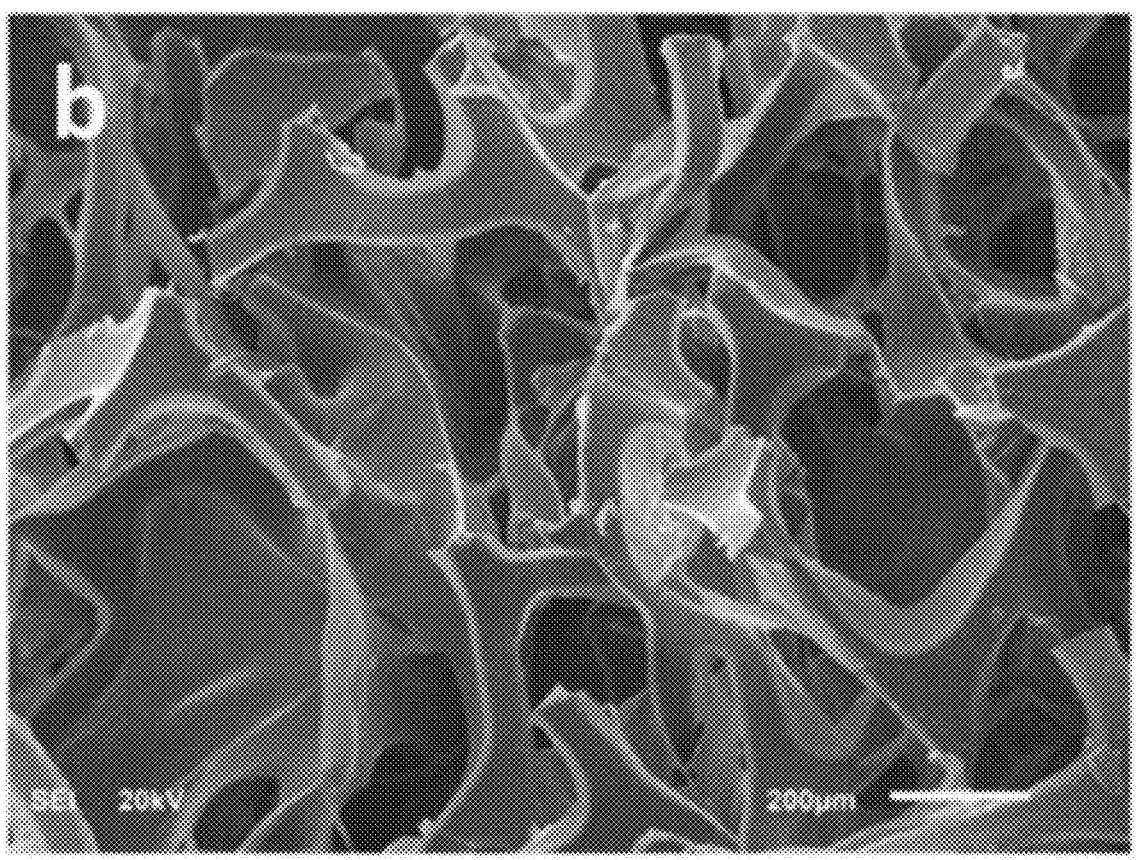
FIG. 4C is a SEM image of PS/PU, scale bar 200 µm.
Figure 4D:
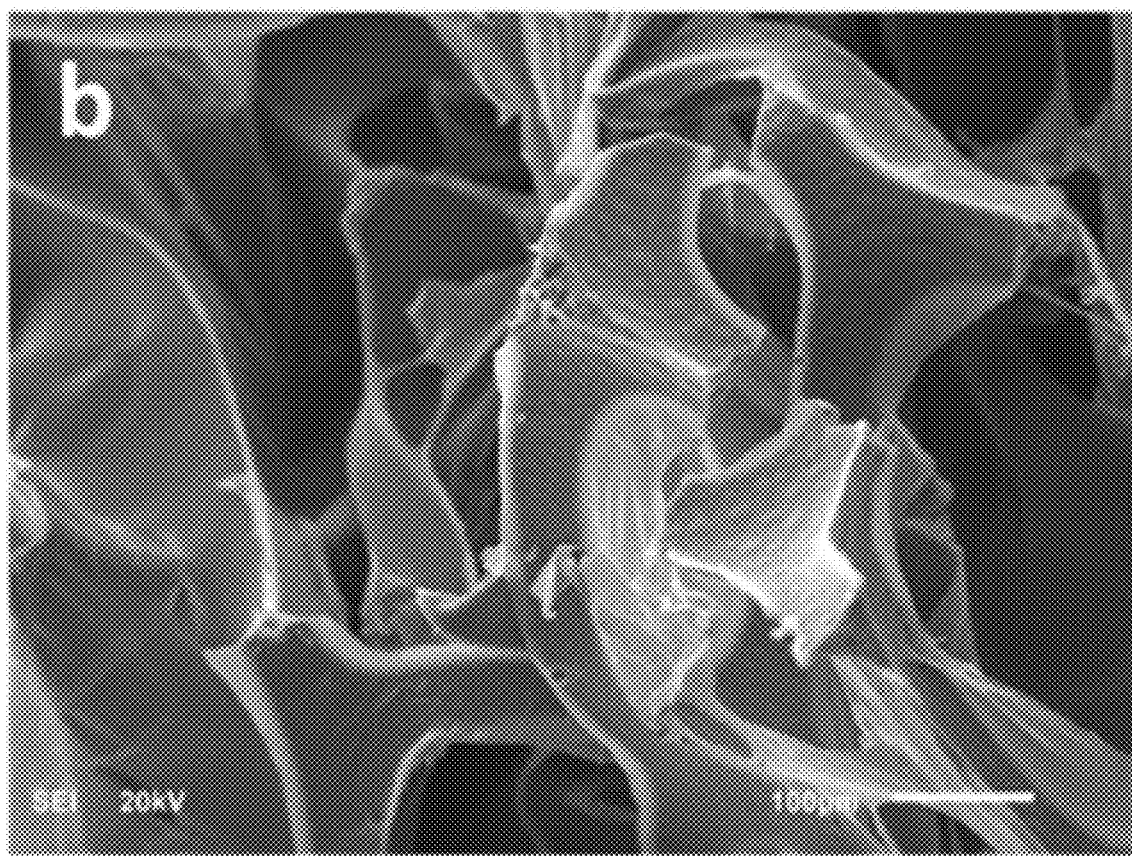
FIG. 4D is a higher magnification SEM image of PS/PU, scale bar 100 µm.

The polyurethane foam has an average pore diameter in a range of 200-850 μm, preferably 300-700 μm, more preferably 350-600 μm, though in some embodiments, a polyurethane foam having an average pore diameter of less than 200 μm or greater than 850 μm may be used. Here, the pore diameter is determined by SEM imaging, such as the SEM image of FIGS. 4A and 4B. In one embodiment, at least 70%, preferably at least 75%, more preferably at least 80% of the surface of the polyurethane foam is coated with the layer r-GO. Here, the surface of the polyurethane foam refers to both the interior surface (for instance, within the pores), and the exterior surface of the foam. In some embodiments, the polyurethane foam may be considered similar to low-resilience (i.e. flexible) polyurethane, memory foam, or a thermoset, polyether-based, polyurethane known as SORBOTHAN®.

In other embodiments, materials with a similar flexibility and porosity to polyurethane foam may also be used, for instance, polyester, polystyrene, vegetal cellulose, or natural sponges. Other materials colloquially known as "plastic foam" or "synthetic sponges" may be used. Plastic foams include ethylene-vinyl acetate (EVA) foam (formed from copolymers of ethylene and vinyl acetate and also referred to as polyethylene-vinyl acetate, PEVA), low-density polyethylene (LDPE) foam, nitrile rubber foam, polychloroprene foam NEOPRENE®, polyimide foam, polypropylene (PP) foam (including expanded polypropylene and polypropylene paper), polyethylene foam, polyvinyl chloride (PVC) foam, closed-cell PVC foam, silicone foam, and microcellular foam. The polyurethane foam may also be considered as a scaffold or substrate for the r-GO.

In one preferred embodiment, the polyurethane foam has an open-cell structure. Solid foams can be closed-cell or open-cell. In closed-cell foam, the gas forms discrete pockets, i.e. cells, each completely surrounded by the solid material. In open-cell foam, the cells connect to each other, and fluid paths usually exist from one side of the foam to the other side. Thus, open-cell foams may be used to filter or absorb fluids.

In one embodiment, the polyurethane foam is an open-cell foam with cells having an average diameter in a range of 220-900 µm, preferably 320-750 µm, more preferably 370-650 µm, though in some embodiments, a polyurethane foam having an average cell diameter of less than 220 µm or greater than 900 µm may be used. In one embodiment, the polyurethane foam may be considered an open-cell foam despite comprising a percentage of closed cells. For instance, the polyurethane foam may comprise 1-20%, more preferably 2-16%, or 3-5% closed cells, relative to a total number of closed cells and open cells.

In one embodiment, the polyurethane foam may comprise open cells having a monodisperse diameter. Here, the diameter of a cell refers to the longest length through the center of the cell. This means that the cells have a coefficient of variation or relative standard deviation, expressed as a percentage and defined as the ratio of the cell diameter standard deviation ($\sigma$) to the cell diameter mean ($\mu$), multiplied by 100%, of less than 25%, preferably less than 10%, preferably less than 8%, preferably less than 6%, preferably less than 5%. In another embodiment, the cells are monodisperse having a diameter distribution ranging from 80% of the average cell diameter to 120% of the average cell diameter, preferably 85-115%, preferably 90-110% of the average cell diameter. In another embodiment, the polyurethane foam comprises open cells that do not have monodisperse diameters.

In one embodiment, the polyurethane foam may comprise open cells that are substantially rounded, meaning that the distance from the geometric center to anywhere defining the boundary of the cell varies by less than 35%, preferably by less than 25%, more preferably by less than 20% of the average distance.

In general, due to the relative thinness of the layer of r-GO and polystyrene on the polyurethane foam, the above descriptions of the cell structure may be equally applicable to the cell structure of the composite material. Alternatively, one or more dimensions as discussed above may be smaller due to the r-GO and polystyrene layer coatings. For instance, the composite material may have pore diameters in a range of 50-500 µm, preferably 60-400 µm, more preferably 70-300 µm which may be easily visible by SEM imaging, as of an example composite material in FIGS. 4E and 4F.

Also, the composite material may have a smaller adsorption and desorption pore size than the polyurethane foam by itself or a polyurethane foam without r-GO and treated to the polystyrene coating. Here, the composite material has an adsorption and desorption pore size in a range of 25-50 Å, preferably 27-45 Å, more preferably 30-40 Å, even more preferably 31-37 Å. In one embodiment, the adsorption pore size may be about 34 Å, and the desorption pore size may be about 33 Å. For comparison, the polyurethane foam may have adsorption and desorption pore sizes in a range of 330-380 Å.

In another embodiment, the composite material has a BET surface area in a range of 50-100 m$^2$/g, preferably 55-80 m$^2$/g, more preferably 60-75 m$^2$/g, or about 67 m$^2$/g. This represents an increase in the BET surface area compared to the polyurethane foam by itself, which may have a BET surface area in a range of 5-30 m$^2$/g, 5-20 m$^2$/g, 10-25 m$^2$/g, 12-20 m$^2$/g, or about 15 m$^2$/g. A polyurethane foam without r-GO and treated with the polystyrene coating may have a BET surface area in a range of 20-35 m$^2$/g.

In one embodiment, the composite material has an apparent contact angle of 130°-170°, preferably 140°-160°, more preferably 145°-155° with a water drop. This contact angle may be observed by placing a drop of water on the surface of the composite material, for instance, by pipetting 40-60 µL of water onto the composite material, or by spraying a mist of water droplets. Preferably, a goniometer may be used to measure the contact angles. In another embodiment, drop sizes of 40-60 µL may be used to observe contact angles The composite material may be considered hydrophobic or superhydrophobic, where a superhydrophobic material has an apparent contact angle of 150° or greater with water. The composite material may also be considered oleophilic.

As mentioned previously, the composite material comprises a layer of reduced graphene oxide (r-GO). Graphene oxide (GO) is an electrically insulating material composed of a single graphene sheet with oxygen functional groups bonded perpendicularly to the graphene basal-plane See Lerf et al., "Structure of graphite oxide revisited" *J. Chem. B,* 102, 4477 (1998). Due to oxygen functional groups such as carboxyls, epoxides, and alcohols, GO is hydrophilic and can readily exfoliate as single sheets when ultrasonicated in H$_2$O. See Stankovich et al., "Synthesis of graphene-based nanosheets via chemical reduction of exfoliated graphite oxide" *Carbon,* 45, 1558 (2007). The average size of an individual GO sheet after oxidation and suspension in H$_2$O may be 1 µm$^2$ or less, with a thickness of approximately 1 to 1.5 nm.

Graphene oxide may be reduced back to graphene by the removal of the oxygen function groups and recovery of the aromatic double-bonded carbon structure. Chemical reduction using hydrazine hydrate demonstrates that the conductivity of GO flakes can be increased by four- to five-orders of magnitude. See Gilje et al., "A Chemical Route to Graphene for Device Applications" Nano Lett., 7, 3394 (2007). In addition, the mobility of reduced flakes exhibit field effect mobilities between 2 to 200 cm$^2$/V·s. See Gomez-Navarro et al., "Electronic Transport Properties of Individually Chemically Reduced Graphene Oxide Sheets" Nano Lett., 7, 3499 (2007). The reduction of graphene oxide may not always be complete, however, and the product, reduced graphene oxide (r-GO), may retain a certain number of oxidized carbons that retain oxygen or oxygen functional groups. Thus, in a strict sense, r-GO may not be atomically similar to pure graphene, though for applications, the two may be considered functionally equivalent.

Graphene is an allotrope of carbon in the form of a two-dimensional, atomic-scale hexagonal lattice in which one atom forms each vertex. Graphene is approximately 200 times stronger than steel by weight and conducts heat and electricity with great efficiency. It is the basic structural element of other allotropes including graphite, charcoal, carbon nanotubes, and fullerenes. Carbon nanotubes are formed by rolling up a graphene sheet into a tubular structure, and graphite is formed by stacking multiple graphene sheets. Graphene or other allotropes of carbon may be synthesized and formed into a variety of morphologies and shapes including, but not limited to, nanoparticles, nanosheets, nanoplatelets, nanocrystals, nanospheres, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanoflowers, etc. and mixtures thereof.

Structurally, graphene is a crystalline allotrope of carbon with 2-dimensional properties. As used herein, graphene is a sheet of six-membered carbon rings that do not form a closed surface. Its carbon atoms are densely packed in a regular atomic-scale "chicken wire" (hexagonal) pattern. Each atom has four bonds, one σ-bond with each of its three neighbors, and one π-bond that is oriented out of the plane. Graphene's hexagonal lattice can be regarded as two interleaving triangular lattices.

Graphene's stability is due to its tightly packed carbon atoms and each carbon atom in a graphene sheet having an $sp^2$ orbital hybridization with delocalized electrons present at opposite surfaces of the graphene sheet. The $sp^2$ hybridization is a combination of orbitals S, $P_x$, and $P_y$ that constitute the σ-bond, and the final $P_z$ electron makes up the π-bond. The π-bonds hybridize together to form the π-band and the π*-band. These bands are responsible for most of graphene's notable electronic properties, via the half-filled band that permits free-moving electrons. Graphene is a zero-gap semiconductor. Graphene is also the only form of carbon in which every atom is available for chemical reaction from two sides due to the 2D structure.

The r-GO of the present invention may comprise less than 15 mol % carbon, preferably less than 5 mol % carbon, more preferably less than 3 mol % carbon involved in a structural or chemical defect, including, but not limited to isotopic impurities, substitutional impurities, vacancies, and interstitial impurities.

In one embodiment, the r-GO of the present disclosure has an oxygen content of less than 5 wt %, preferably less than 4 wt %, preferably less than 3 wt %, preferably less than 2 wt %, preferably less than 1 wt % relative to a total weight of the r-GO. In one embodiment, the r-GO of the present disclosure has a C/O ratio of at least 10, preferably at least 20, preferably at least 30, preferably at least 40, preferably at least 50, preferably at least 75, preferably at least 100, preferably at least 150, preferably at least 200. In one embodiment, the r-GO may have a C/O ratio of less than 10, preferably less than 5, preferably less than 4, preferably less than 3, preferably less than 2.

In one embodiment, the r-GO of the present disclosure may be chemically modified; graphene is commonly modified with nitrogen and oxygen containing functional groups. For instance, the r-GO may be formed from graphene oxide that is only partially reduced. Exposed carbon on the edges of nanosheets or nanoplatelets often reacts with the atmosphere to form hydroxyls, carboxyls, lactones, pyrones, alcohols, carbonyls, imines, and/or amines. These modifications may be covalent, non-covalent, or mixtures thereof. Examples of functional groups on r-GO include, but are not limited to, alcoholic, carboxylic, aldehydic, ketonic, and esteric oxygenated functional groups. Alternatively, the r-GO may be chemically modified with amine or imine functionality. Chemical functionalization of the r-GO may aid the adsorption/absorption of different liquids, or improve the interface between the r-GO and the polyurethane foam and/or the polystyrene.

In one embodiment, the r-GO of the present disclosure is in the form of nanoplatelets that have a thickness of 40-110 nm, preferably 45-105 nm, more preferably 50-100 nm, or a thickness of 0.5-30 nm, 1-2 nm, or 1-1.5 nm, and diameters of 5-45 μm, preferably 10-40 μm, more preferably 15-35 μm. In one embodiment, the r-GO nanoplatelets have a length to thickness aspect ratio of 40:1-1,200:1, preferably 50:1-1,000:1, more preferably 70:1-900:1. Nanoplatelets having dimensions as discussed above may also be referred to as sheets, nanosheets, nanoflakes, nanoparticles, or platelets. In an alternative embodiment, a different carbonaceous nanomaterial may be used in place of the r-GO nanoplatelets, such as carbon black (e.g., furnace black and Ketjen black), active carbon, carbon nanorods, carbon nanotubes, carbon fibers, graphene, graphite, expandable graphite, graphene oxide, exfoliated graphite nanoplatelets, thermally reduced graphene oxide, chemically reduced graphene oxide, and mixtures thereof. In another embodiment, the r-GO of the present disclosure may be in the form of sheets having a thickness of 0.5-1.5 nm, or less than 1.5 nm, and having lengths in a range of 50 nm-40 μm, preferably 70 nm-10 μm, more preferably 0.1-5 μm, or 0.5-2 μm. In some cases, two or more sheets of r-GO may be twisted, stuck, or bundled together, leading to a greater combined thickness and/or combined length.

In one embodiment, the layer of r-GO further comprises carbon nanoparticles having an average diameter in a range of 1-2 μm, preferably 1.1-1.9 μm, more preferably 1.2-1.8 μm, though in some embodiments, the layer may further comprise carbon nanoparticles having an average diameter of less than 1 μm or greater than 2 μm. The nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. In one embodiment, the carbon nanoparticles may be substantially spherical, meaning that the distance from the nanoparticle centroid (center of mass) to anywhere on the nanoparticle outer surface varies by less than 30%, preferably by less than 20%, more preferably by less than 10% of the average distance.

In one embodiment, the carbon nanoparticles may be present within agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the carbon nanoparticles having a mean diameter as previously described.

In one embodiment, the layer of r-GO further comprises carbon nanotubes at a weight percentage of 5-80 wt %, preferably 10-60 wt %, more preferably 12-20 wt %, relative to a total weight of the r-GO. In some embodiments, the layer of r-GO may comprise greater than 80 wt % carbon nanotubes. However, in another embodiment, the composite material does not contain carbon nanotubes, or may contain less than 1 wt % carbon nanotubes, preferably less than 0.2 wt % carbon nanotubes, relative to a total mass of carbon.

In one embodiment, the layer of r-GO has an average thickness of 500 nm-4.5 μm, preferably 1-4 μm, more preferably 1.5-3.5 μm on the polyurethane surface. However, in some embodiments, the layer of r-GO may have an average thickness of less than 500 nm or greater than 4.5 μm. In one embodiment, the r-GO may form a disorganized, dense meshwork where only 0.5-5%, preferably 1-3% of the r-GO sheets, relative to the total number of r-GO sheets, directly contact the polyurethane surface. In one embodiment, at least 70%, preferably at least 75%, more preferably at least 80%, or at least 85% or at least 90% or at least 95% of a total surface of the polyurethane foam is coated with the layer of r-GO. In one embodiment, due to the adsorption of the r-GO in the preparation of the composite material, the r-GO may comprise sheets or nanoplatelets that generally lay flat against the nearest surface of the polyurethane foam structure. In a related embodiment, the sheets or nanoplatelets do not protrude from the polyurethane surface. Sheets or nanoplatelets of r-GO, even those attached from or in contact by only one end to the polyurethane surface, may be attached at an angle or attached substantially perpendicularly (i.e. forming an angle 70°-110° with the polyurethane surface) and then curved or bent to lay flat.

In one embodiment, the layer of r-GO may have a bulk density of 0.001-1.0 g/cm$^3$, preferably 0.005-0.20 g/cm$^3$, more preferably 0.01-0.15 g/cm$^3$. In one embodiment, the layer of r-GO may comprise sheets or nanoplatelets having curved portions having a radius of curvature of 100 nm-5 µm, preferably 500 nm-4 µm, more preferably 900 nm-3 µm.

As mentioned previously, the composite material comprises a layer of polystyrene in contact with the layer of r-GO. Styrene, also known as ethenylbenzene, vinylbenzene, and phenylethene, is an organic compound with the chemical formula $C_6H_5$—$CH$=$CH_2$. This derivative of benzene is a colorless oily liquid that evaporates easily and has a sweet smell, although high concentrations have a less pleasant odor. Styrene is the precursor to polystyrene and several copolymers. For instance, the presence of the vinyl group allows styrene to polymerize. Commercially significant products include polystyrene, ABS, styrene-butadiene (SBR) rubber, styrene-butadiene latex, SIS (styrene-isoprene-styrene), S-EB-S (styrene-ethylene/butylene-styrene), styrene-divinylbenzene (S-DVB), styrene-acrylonitrile resin (SAN), and unsaturated polyesters used in resins and thermosetting compounds. In the present disclosure, the composite material comprises a polystyrene layer.

Polystyrene results when styrene monomers interconnect. In the polymerization, the carbon-carbon π bond of the vinyl group is broken and a new carbon-carbon σ bond is formed, attaching to the carbon of another styrene monomer to the chain. The newly formed σ bond is stronger than the π bond that was broken, thus it is difficult to depolymerize polystyrene. About a few thousand monomers typically comprise a chain of commercially available polystyrene, giving a molecular weight of 100-400 kDa. The polystyrene of the polystyrene layer herein may have a weight average molecular weight, or a number average molecular weight, in a range of 0.4-400 kDa, preferably 0.5-300 kDa, more preferably 0.6-200 kDa.

In one embodiment, at least 70%, preferably at least 75%, more preferably at least 80%, or at least 85%, 90% of a total exposed surface of the composite material is the layer of polystyrene. In some embodiments, the polystyrene layer may be disjointed or continuous. The polystyrene layer may be in contact with parts of the polyurethane foam in some locations and in contact with the r-GO layer in other locations. In one embodiment, the polystyrene layer may only be in contact with the r-GO layer. In another embodiment, where the total exposed surface of the composite material comprises less than 100% polystyrene, the remaining exposed surface may comprise r-GO, polyurethane, or both. In one embodiment, the layer of polystyrene and r-GO covers 50-90%, more preferably 60-80%, even more preferably 70-80% of the polyurethane surface area, meaning that from a certain view angle normal to the polyurethane surface, only 10-50%, preferably 20-40%, even more preferably 20-30% of the polyurethane surface is visible.

Figure 7A:
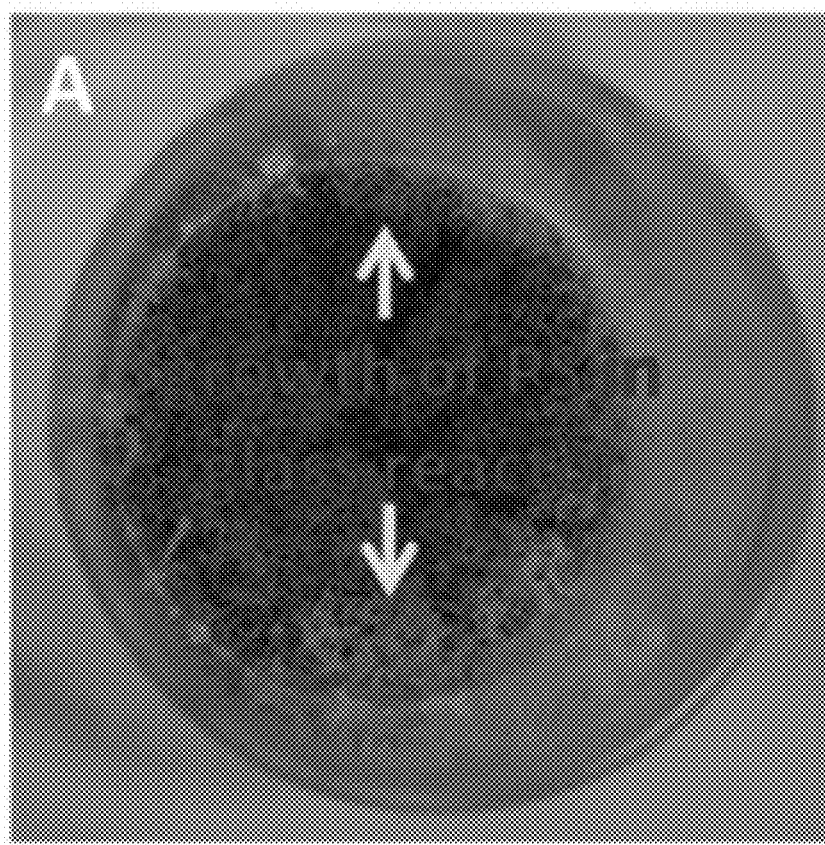
FIG. 7A shows the growth of PS into GR/PU in the glass reactor
Figure 7B:
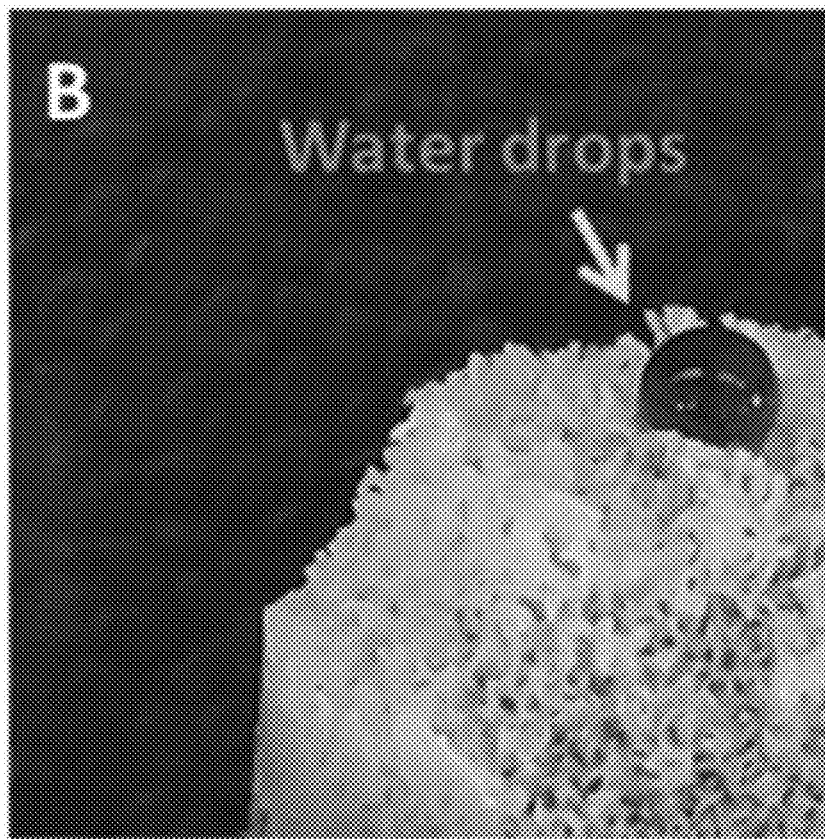
FIG. 7B shows the complete retention of water on the upper side of the zz-PS/GR/PU.
Figure 7C:
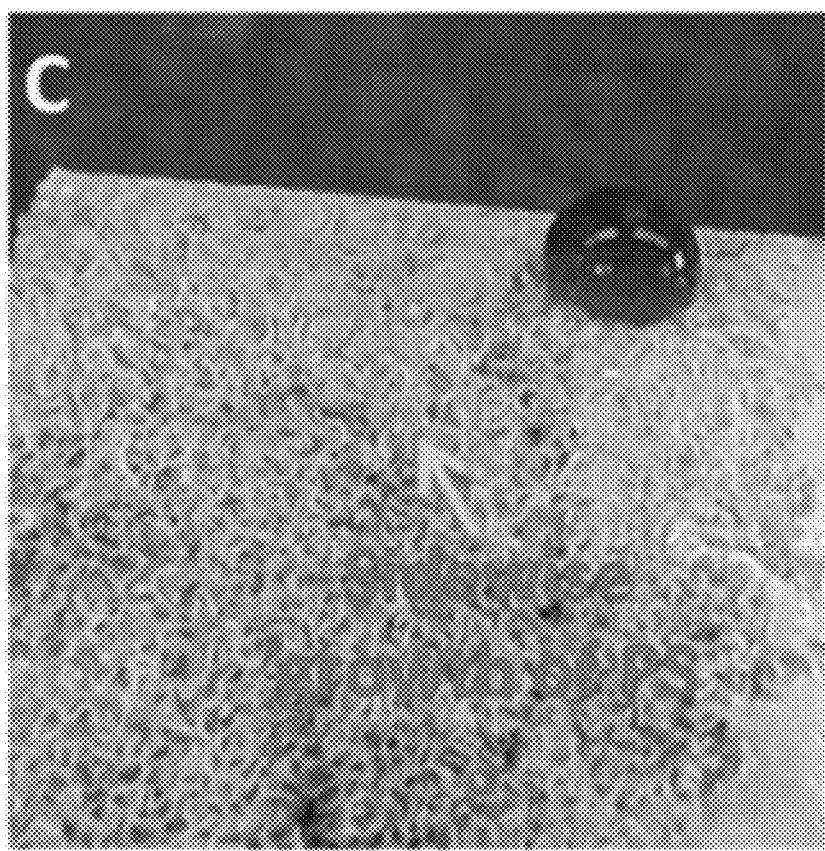
FIG. 7C shows the sidewise growth of PS and retention of water.
Figure 7D:
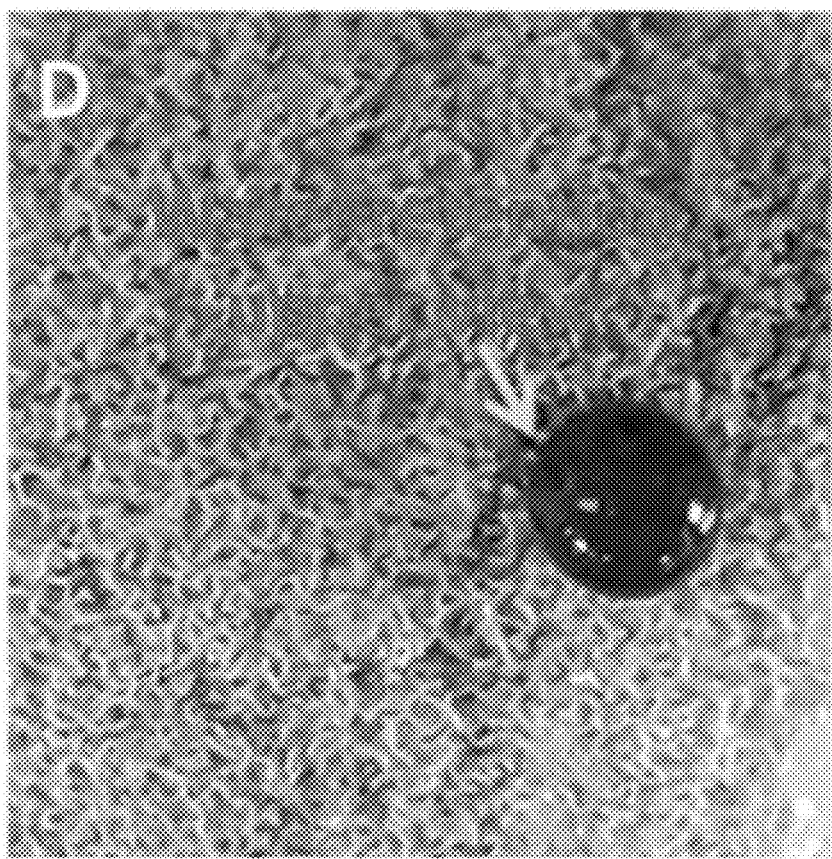
FIG. 7D shows an upper view of the zz-PS/GR/PU retaining water.
Figure 7E:
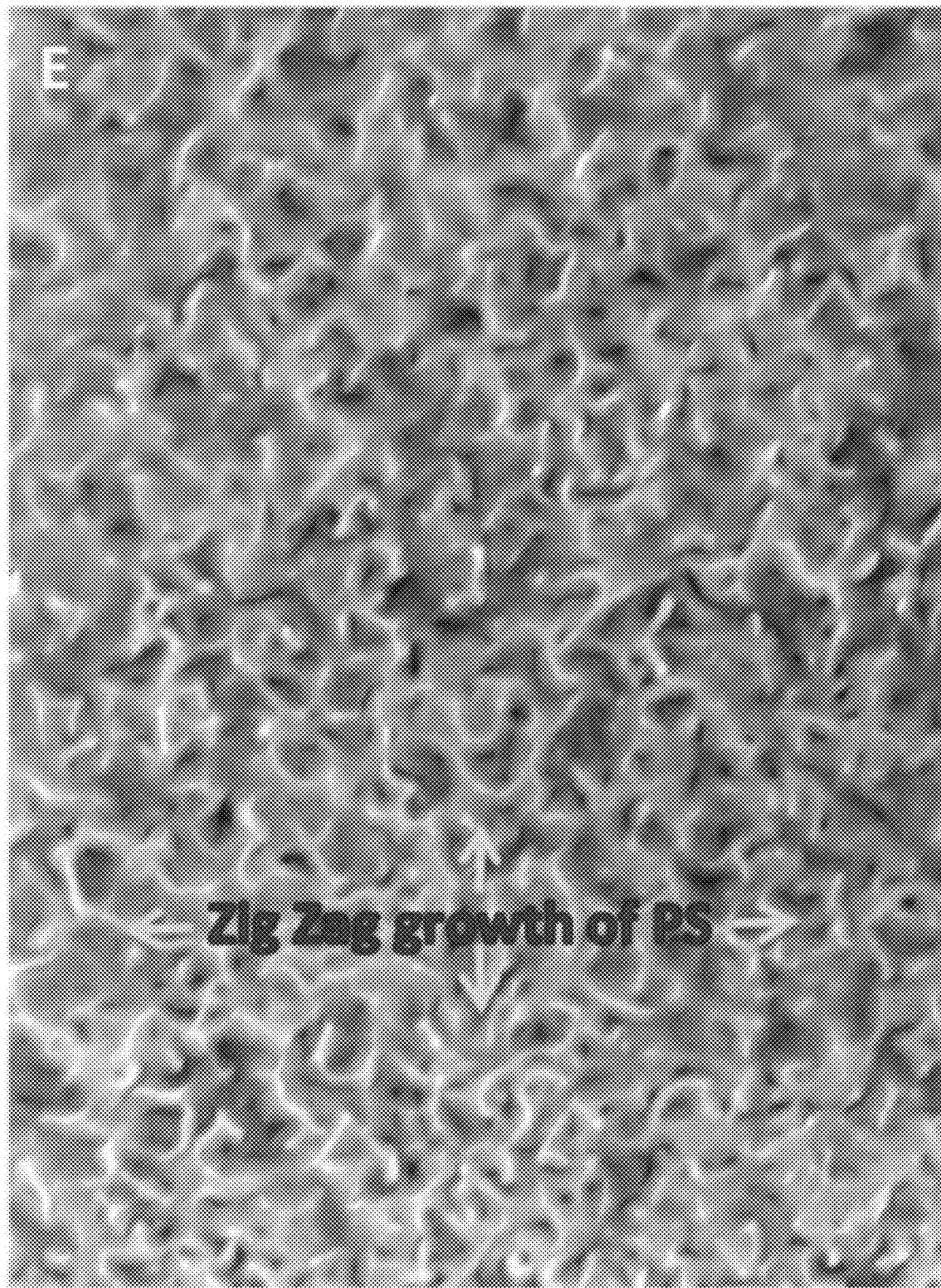
FIG. 7E is a magnified image displaying the zigzag formation of PS into GR/PU.

In one embodiment, the polystyrene layer may add a rough or wavy texture that does not exist on an underlying r-GO or polyurethane surface. For instance, the polystyrene layer may create the appearance of zig-zag shaped ridges that are noticeable by the naked eye, as illustrated in FIG. 7E. For instance, the zig-zag shaped ridges may comprise substantially linear segments having an average length in a range of 0.2-3 mm, preferably 0.5-2.5 mm, more preferably 0.8-2.0 mm. These substantially linear ridges may then connect end-to-end or end-to-midsection with other ridges, forming average acute angles in a range of 20°-60°, preferably 25°-55°, more preferably 30°-50°.

Figure 4E:
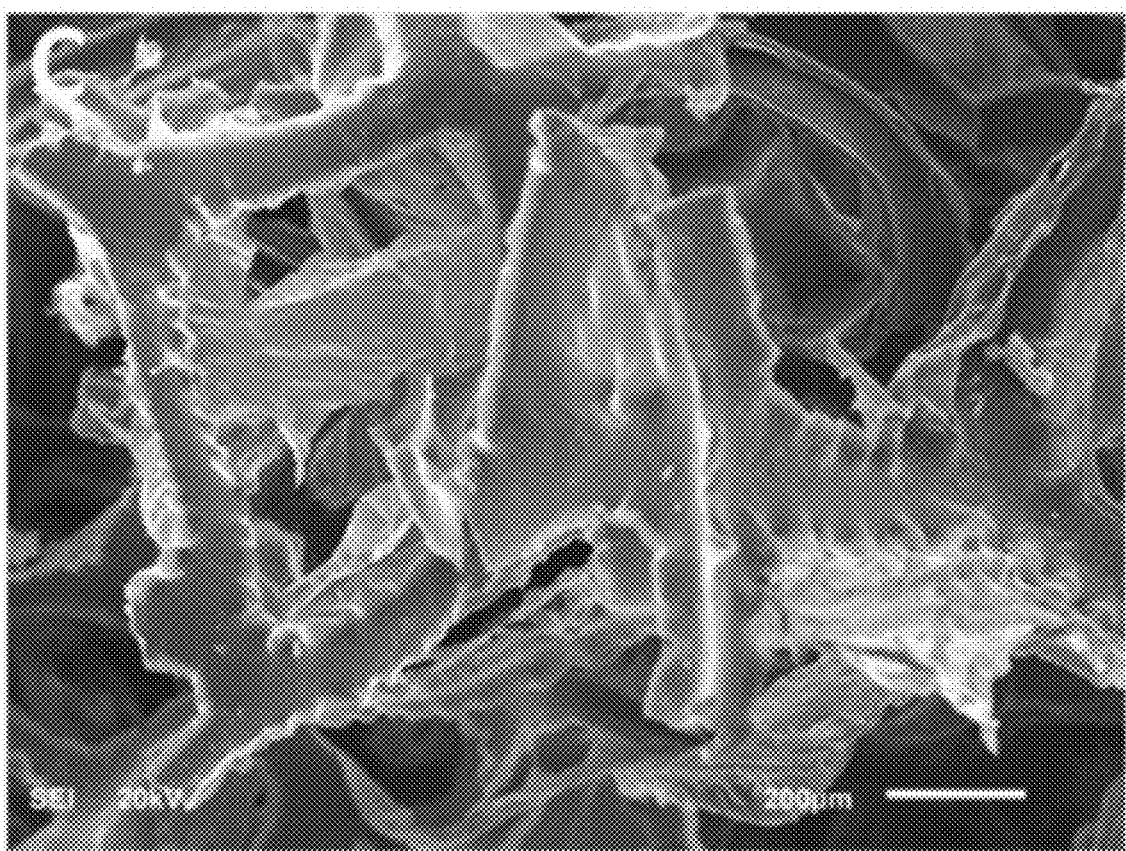
FIG. 4E is a SEM image of 3D zz-PS/GR/PU, scale bar 200 µm.
Figure 4F:
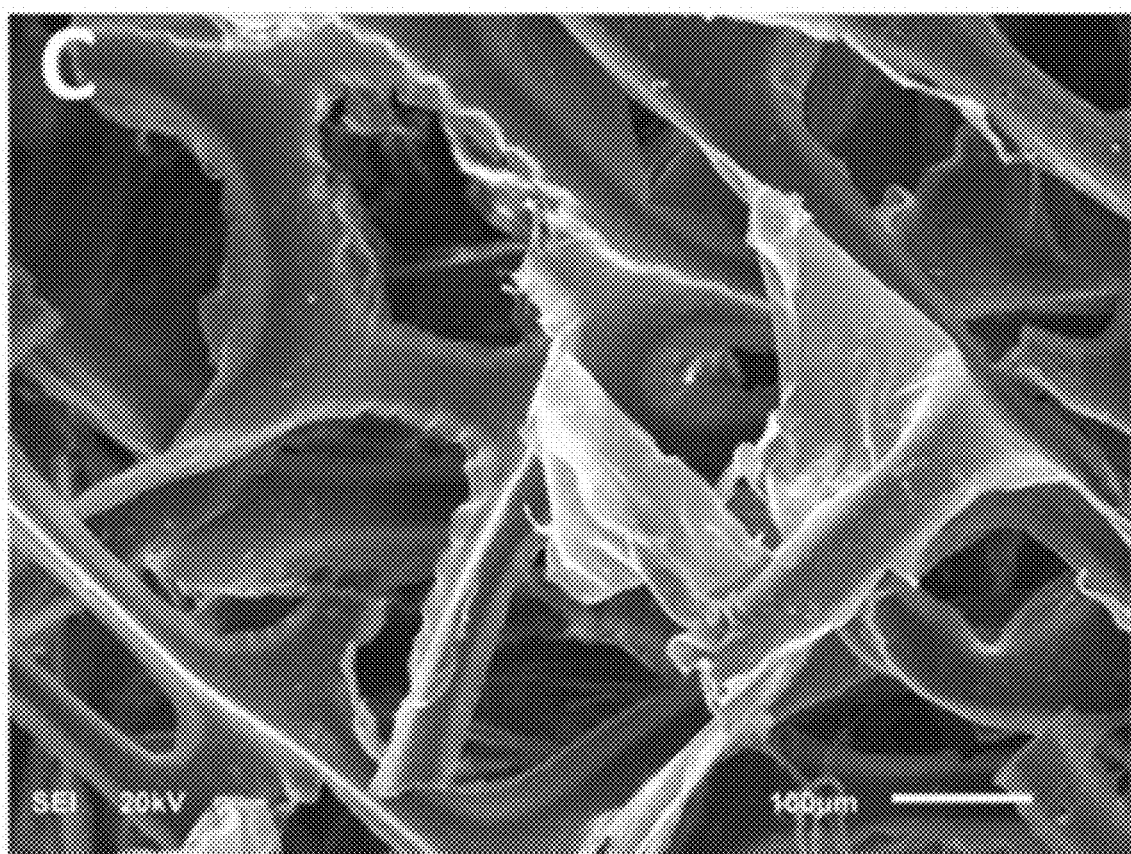
FIG. 4F is a higher magnification SEM image of 3D zz-PS/GR/PU, scale bar 100 µm.

Additionally, under SEM imaging, as in FIGS. 4E and 4F, the polystyrene layer may create additional wavy surfaces on the polyurethane/r-GO scaffold that have spacing in a range of 10-50 µm, preferably 20-45 µm.

In one embodiment, the layer of polystyrene has an average thickness of 500 nm-4.5 µm, preferably 1-4 µm, more preferably 1.5-3.5 µm on the r-GO and/or polyurethane surface. However, in some embodiments, the layer of polystyrene may have an average thickness of greater than 4.5 µm. In one embodiment, the polystyrene layer may comprise at least 95 wt %, preferably at least 98 wt %, more preferably at least 99 wt % polystyrene. In another embodiment, the polystyrene layer may comprise 0-3 wt % or 0.01-0.50 wt % styrene monomer. In other embodiments, styrene derivatives other than polystyrene, such as those previously mentioned, may be used in place of or instead of polystyrene in the composite material.

In an alternative embodiment, other polymeric compounds may be used in place or with the polystyrene. Suitable polymers may be selected from the group including, but not limited to, polyacrylates, acrylics, poly(acrylic acid), poly(acrylonitrile), poly(2-hydroxyethylmethacrylate), sodium polyacrylate, ethylene glycol dimethacrylate, poly(vinyl pyridine), poly(methyl acrylate), polymethacrylates, poly(methyl methacrylate), polychloroprene, polyacrylamide, poly(N-isopropylacrylamide), poly(tetrafluoroethylene) (PTFE), poly(N-vinyl pyrrolidone), poly(vinyl pyrrolidinone), poly(vinyl pyridine), polyethylenes, low-density poly(ethylene), high-density poly(ethylene), chlorinated polyethylene (CPD), poly(propylene), poly(isobutylene), poly(butylene), polyvinyl chlorides (PVC), polyvinyl chloride acetate, polyacrylonitriles, poly(ethyl acetate), poly(vinyl acetate), polyvinylacetates, polyvinyl acetate phthalate, ethylene vinyl acetates, poly(ethylene glycol), polyphenylene ethers, poly(ethylene vinyl alcohol), poly(vinylidene fluoride), poly(p-phenylenevinylene), poly(benzoxazole), polyphenylenebenzobisoxazole (PBO), polyaryletherketones, poly(ether ether ketones), polyphenylenesulfides, polyamide imides, polyarylates, polyarylsulphones, ethyl-vinyl-alcohol copolymers, copolymers of ethylene and 1-alkenes, polybutene-1, polymethylpentene, amorphous poly-alpha-olefins (APAO), terephthalates, polyacetylene, polyethylene oxides, polycycloolefins, polyisoprenes, polyamides, poly(ethylene terephthalate), poly(trimethylene terephthalate), poly(butylene terephthalate), polycarbonates, polychlorotrifluoroethylene, polyvinyldifluoride, polyperfluoroalkoxy, poly(ethylene oxide), ethylene oxide copolymers, poly(ethylene imine), poly(dimethyl siloxane), polysiloxanes, fluorosilicones, fluoropolymers, polybutadienes, butadiene copolymers, epoxidized natural rubbers, epoxy polymer resins, poly (cis-1,4-isoprene), poly (trans-1,4-isoprene), viton, phenolic resins, acrylic resins, vinylacetate resins, polyurethanes, polyurethane-urea, thermosetting polyimides, thermoplastic polyimides, poly(amic acid), polysulfones, polyetherimides, polyethersulfones, chlorosulfonates, polyoxymethylene, polyphenylene oxide, polyphenylenes, perfluorinatedpolyethylenepropylene, polyvinylidene chloride, fluoropoly(ether-imide), polyolefins, aromatic polyamides (Aramid, para-aramid), polyesters, conducting and conjugated polymers, liquid crystal polymers, liquid crystalline polyesters, vectran, biodegradable thermoplastic polyesters and their copolymers, thermosetting polyesters, unsaturated polyesters, acetals, fluorinated elastomers, rubbers, bismaleimides, copolymer rubbers, ethylene-propylene, ethylene-propylene-diene monomers (EPDM), nitrile-butadienes, nylons, thermoplastic continuous and discontinuous fiber composites, thermosetting continuous and discontinuous fiber composites, specialty polymers, and blends, mixtures, alloys, and copolymers thereof.

According to a second aspect, the present disclosure relates to a method of making the composite material of the first aspect, comprising the steps of contacting a polyurethane foam with a suspension of r-GO in an alcohol to produce a wet scaffold, drying the wet scaffold to produce a r-GO grafted polyurethane composite, and irradiating the r-GO grafted polyurethane composite in the presence of a styrene vapor to produce the composite material.

The suspension of r-GO refers to a dispersed or solubilized mixture of r-GO which does not settle. In a further embodiment, the suspension does not settle even with centrifugation. In one embodiment, the r-GO is present in the suspension at a concentration of 0.1-5 mg/mL, preferably 0.2-3 mg/mL, more preferably 0.3-1 mg/mL, or about 0.5 mg/mL. The suspension may be made by contacting the r-GO with a solvent, such as an alcohol, in order that the r-GO may be dispersed in the alcohol.

In one embodiment, the r-GO is dispersed in an alcohol which may be benzyl alcohol, cyclohexanol, pentyl alcohol, phenol, 1-propanol, methanol, ethanol, butanol, isopropanol, or mixtures thereof. Preferably the alcohol is methanol, ethanol, butanol, or isopropanol. In a preferred embodiment, the alcohol is ethanol.

In other embodiments, other solvents and liquids may be used for forming the r-GO suspension. The solvent may be organic or aqueous, such as, for example, water, chloroform, chlorobenzene, water, acetic acid, acetone, acetonitrile, aniline, benzene, benzonitrile, bromobenzene, bromoform, carbon disulfide, carbon tetrachloride, cyclohexane, decalin, dibromethane, diethylene glycol, diethylene glycol ethers, diethyl ether, diglyme, dimethoxymethane, N,N-dimethylformamide, ethylamine, ethyl benzene, ethylene glycol ethers, ethylene glycol, ethylene glycol acetates, propylene glycol, propylene glycol acetates, ethylene oxide, formaldehyde, formic acid, glycerol, heptane, hexane, iodobenzene, mesitylene, methoxybenzene, methylamine, methylene bromide, methylene chloride, methylpyridine, morpholine, naphthalene, nitrobenzene, nitromethane, octane, pentane, terpineol, texanol, carbitol, carbitol acetate, butyl carbitol acetate, dibasic ester, propylene carbonate, pyridine, pyrrole, pyrrolidine, quinoline, 1,1,2,2-tetrachloroethane, tetrachloroethylene, tetrahydrofuran, tetrahydropyran, tetralin, tetra methylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solvent may be a halogenated organic solvent such as 1,1,2,2-tetrachloroethane, chlorobenzene, chloroform, methylene chloride, 1,2-dichloroethane, or chlorobenzene.

A preferred method of forming a suspension of r-GO is by sonication. For example, a given amount of r-GO is contacted or mixed with a given solvent and subjected to sonication for a given period of time, for instance, 5 min-2 h, preferably 10 min-1 h, more preferably 20-45 min, or about 30 min. The sonicator may be a bath sonicator or a sonicating horn or probe tip. In alternative embodiments, a different method of forming a suspension of r-GO may be used, for instance, media milling, shaking, or high-shear mixing. In one embodiment, cold water, such as by chilling with refrigeration or with ice, may be used as a bath to keep the sonication from overheating the suspension.

Preferably the contacting involves completely submerging the polyurethane foam within the suspension. For submerging, preferably a ratio of the polyurethane foam bulk volume to the suspension volume is 1:1,000-1:1, preferably 1:50-1:1, more preferably 1:5-1:1. The bulk volume of the polyurethane foam may be considered the volume of its convex hull. However, dip-coating may be used with the polyurethane foam being only partially submerged at any one time, but the foam may be rotated to ensure an even coating.

In other embodiments, the contacting involves spraying, dropping the suspension onto the polyurethane foam, injecting the suspension inside the foam, or rotating the foam with the suspension. The polyurethane foam may be compressed and then slowly expanded or decompressed while contacting in order to encourage a flow of the suspension to the inside of the foam. Particularly, when the polyurethane foam is submerged in the suspension, compressing and decompressing the foam may drive out air bubbles by filling pores of the foam with the suspension.

In one embodiment, the contacting is done for a period of 3-60 min, preferably 3.5-45 min, more preferably 4-30 min, even more preferably about 5 min. However, in some embodiments, the contacting may be done for a period of time much longer than 60 minutes, for instance, a polyurethane foam may be kept submerged in a r-GO suspension for 12-24 hours, or overnight.

In one embodiment, the drying is at a temperature of 50-80° C., preferably 55-75° C., more preferably 58-65° C., even more preferably about 60° C. for a period of 6-24 h, preferably 10-20 h, or about 12 h, 18 h, or overnight. In another embodiment, the drying may be done at a temperature lower than 50° C., for instance, 40-45° C. In other embodiments, a desiccator may be used. Following the drying period, a r-GO grafted polyurethane composite is produced. In one embodiment, the r-GO grafted polyurethane composite has a BET surface area in a range of 5-20 $m^2/g$, preferably 6-18 $m^2/g$, more preferably 10-17 $m^2/g$.

In one embodiment, the contacting and drying are each repeated one or more times on the r-GO grafted polyurethane composite. For instance, the contacting and drying may be repeated two more times or three more times. This repeated contacting and drying may increase the amount of r-GO deposited on the composite by allowing additional r-GO to adsorb to the existing layer of r-GO or to adsorb to uncovered regions of polyurethane. The repeated contacting may increase the BET surface area of the composite by creating a thicker layer of r-GO.

As mentioned previously, the r-GO grafted polyurethane composite is irradiated in the presence of a styrene vapor to produce the composite material. The styrene vapor may have a vapor pressure in a range of 4-20 mm Hg, preferably 6-15 mm Hg, more preferably 7-10 mm Hg within or in contact with the r-GO grafted polyurethane composite. In other embodiments, 1-99 vol %, preferably 5-80 vol %, more preferably 6-70 vol % of the gas in contact with the r-GO grafted polyurethane composite may be styrene vapor. Preferably the styrene vapor is produced from a volume of liquid styrene in proximity to the r-GO grafted polyurethane composite. In one embodiment, the styrene vapor may be partially confined by placing liquid styrene in the bottom of a tube or flask, and then covering the opening of the tube or flask with the r-GO grafted polyurethane composite. In one embodiment, the space above the r-GO grafted polyurethane composite may also be covered. In a related embodiment, the r-GO grafted polyurethane composite may be located within a tubing. Preferably the r-GO grafted polyurethane composite has a shape that is able to press against the sides of the tubing or flask so that no gaps are present between a sidewall of the flask or tubing and the r-GO grafted polyurethane composite. This configuration may force any escaping styrene vapor to contact and pass through the r-GO grafted polyurethane composite. In one embodiment, molecules of styrene may adsorb to the exterior or interior surface of the r-GO grafted polyurethane composite, and may be in direct contact with r-GO and/or polyurethane.

In one embodiment, where liquid styrene is used, a volume ratio of the liquid styrene to the bulk volume of the r-GO grafted polyurethane composite may be in a range of 1:1,000-10:1, preferably 1:100-5:1, more preferably 1:50-2:1, where the bulk volume of the r-GO grafted polyurethane composite may be considered the volume of its convex hull. In one embodiment, a ratio of the headspace volume between the liquid styrene and the r-GO grafted polyurethane composite and the r-GO grafted polyurethane composite bulk volume may be in a range of 1:10-10:1, preferably 1:8-8:1, more preferably 1:5-5:1. In one embodiment, the bulk volume of the r-GO grafted polyurethane composite may be 0.5-1,000 $cm^3$, preferably 0.8-100 $cm^3$, more preferably 1-20 $cm^3$. In one embodiment, a volume of liquid styrene may be in a range of 0.5-10 mL, preferably 1-5 mL, or about 3 mL.

In one embodiment, the liquid styrene, if present, the styrene vapor, and the r-GO grafted polyurethane composite are located within containers that are optically transparent, such as glass, quartz, or certain plastics, so that the styrene vapor and r-GO grafted polyurethane composite may be irradiated from an external source of irradiation. The source of irradiation may be a flame, a lantern, a gas discharge lamp (such as a xenon, sodium, or mercury vapor lamp), an incandescent bulb, a laser, a fluorescent lamp, an electric arc, a light emitting diode (LED), a cathode ray tube, sunlight or some other source of light. Preferably the source of irradiation is sunlight. An illumination power density of the irradiation may be in a range of 40-200 $mW/cm^2$, preferably 80-150 $mW/cm^2$. Preferably the irradiation is with one or more visible light wavelengths, or with a UV wavelength.

The irradiation may serve a dual purpose of producing styrene vapor by heating the styrene liquid, and also by initiating (photocatalyzing) the polymerization of styrene into polystyrene. In alternative embodiments, a styrene liquid may be heated by other means to produce a vapor, for instance, microwave-heating, a hot water bath, a steam bath, a heat gun, a heat lamp, a heating block, a heating mantle, an oven, a wire heating element, an ultrasonicator, or by other non-microwave electromagnetic irradiation sources, such as an infrared laser. Preferably the temperature of the styrene liquid remains below 80° C., preferably below 70° C. or 60° C. Alternatively, in other embodiments, the liquid styrene and/or styrene vapor may be cooled in order to prevent overheating when being exposed to sunlight and/or warm outdoor temperatures.

In one embodiment, the styrene must be adsorbed to the r-GO grafted polyurethane composite in order to polymerize. In another embodiment, molecules of styrene vapor may begin to polymerize and then dimers, trimers, and other oligomers of styrene may adsorb to an interior or exterior surface of the r-GO grafted polyurethane composite. Adsorbed dimers, trimers, and other oligomers may continue to polymerize to form larger molecules of polystyrene.

In one embodiment, a styrene or a polystyrene molecule adsorbed to the r-GO surface may covalently bond to the r-GO. For instance, the photocatalyzing of the styrene and polystyrene may allow styrene and polystyrene to form a covalent bond to the r-GO surface rather than growing a polymer chain. In one embodiment, during the irradiating, some styrene and polystyrene may be polymerized while some may form covalent bonds to the r-GO. In one embodiment, a styrene or polystyrene that forms a covalent bond to r-GO at one end is still able to polymerize at the other end. At the end of the photocatalyzation process, there may be a mix of styrene and polystyrene molecules adsorbed to the r-GO surface with other styrene and polystyrene molecules covalent bond to the r-GO surface. For instance, of the total number of styrene and polystyrene molecules on the r-GO surface, 30-80%, 40-70% may be covalently bonded while the remaining percentage may be adsorbed without forming covalent bonds. In one embodiment, styrene and/or polystyrene may not adsorb as easily or readily to pure graphene as compared with r-GO. In another embodiment, styrene and/or polystyrene may not form covalent bonds to the surface of graphene as easily as to the surface of r-GO. In one embodiment, the existing functionalities of r-GO, such as oxygen containing groups, may provide places for the styrene and/or polystyrene to adsorb or form covalent bonds with.

In an alternative embodiment, a pure form of graphene may be used in place of r-GO, though as mentioned previously, the resulting structure and degree of adsorption or covalent bonding may be different than with the r-GO.

In one embodiment, the irradiating may be carried out for a time in a range of 10 min-24 h, preferably 15 min-4 h, more preferably 20 min-2 h. In one embodiment, the irradiating may be carried out for a time in a range of 10 min-4 h, preferably 15 min-3 h, more preferably 20 min-2 h, even more preferably 30 min-1.5 h, or 45 min-1 h, or 10 min-1 h. In one embodiment, the irradiating may be performed continuously until the liquid styrene has completely vaporized. In another embodiment, the r-GO grafted polyurethane composite may be rotated or the irradiation source or light path adjusted in order to irradiate from different sides.

In one embodiment, the method further comprises the step of contacting the composite material with toluene after the irradiating. Here, the composite material may be submerged into toluene, or toluene may be poured onto it. Then, the composite material may be immediately dried. The toluene may remove an amount of polystyrene from the composite material. Since excessive polystyrene may limit the compressibility of the composite material, the toluene may remove a portion of the polystyrene in a way that increases the compressibility of the composite material. Having an increased compressibility may enable an increased usability of the composite material. The toluene treatment may also increase a weight gain ratio or adsorption capacity of the composite material. In one embodiment, the step of contacting with toluene may remove 0.1-70 wt %, preferably 1-50 wt %, more preferably 2-35 wt % polystyrene relative to a total weight of the polystyrene before the contacting. The composite material may be in contact with toluene for a time period of 2 s-5 min, preferably 5 s-1 min, more preferably 7 s-20 s. In other embodiments, other solvents, such as those previously listed, may be used instead of toluene.

In a preferred embodiment, the entire method of making the composite material does not involve the use of silanes or a silanization reaction. In another embodiment, the entire method of making the composite material does not involve heating any materials at temperatures above 80° C. In other embodiments, the heating is primarily used for the drying step, and optionally, the styrene vaporization, thus, drying temperatures of 80° C., 70° C., 60° C., 50° C., or lower may set the maximum temperature involved in the entire process. In some embodiments, where the drying uses a desiccator at room temperature, the entire method may be carried out at temperatures of no greater than room temperature. In certain cases, while sonicating to form a suspension of r-GO, active cooling may be required to maintain low maximum pressures.

According to a third aspect, the present disclosure relates to a method of separating a nonpolar compound from an aqueous solution in a mixture. This involves contacting the mixture with the composite material of the first aspect, where the composite material adsorbs 8-25, preferably 9-22 times, more preferably 10-20 times its weight of the nonpolar compound. In the context of this disclosure, the composite material adsorbing the nonpolar compound is considered equivalent to the composite absorbing the nonpolar compound.

In one embodiment, the mixture may be a contaminated water mixture. The mixture may come from petroleum extraction or processing. In other embodiments, the contaminated water mixture may come from an ocean, a bay, a river, a lake, a swamp, a pond, a pool, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaners, or some other place that may generate contaminated water mixtures, or contaminated oil-water mixtures. In some embodiments, the contaminated water mixture may be in the form of an emulsion. In one embodiment, an aqueous dye or pigment may be used to visualize the aqueous phase of the mixture without dying the nonpolar phase.

In one embodiment, the nonpolar compound may adopt a liquid state at room temperature (20-27° C.). The nonpolar compound may be a linear or branched alkane with a general formula of $C_nH_{2n+2}$, where n may have a value of 5-18, preferably 10-17, more preferably 12-16. In another embodiment, the nonpolar compound may have a surface tension at 19-22° C. of 10-50 mN/m, preferably 15-40 mN/m, more preferably 20-35 mN/m. In other embodiments, the nonpolar compound may be some other organic molecule with a nonpolar or hydrophobic character and similar surface tension. In other embodiments, the nonpolar compound may be a mixture of organic molecules, for instance, a plant-based oil or a petroleum product such as mineral oil. In one embodiment, the nonpolar compound is at least one selected from the group consisting of hexane, heptane, octane, toluene, xylene, and a petroleum-derived liquid. In one embodiment, the nonpolar compound is a petroleum-derived liquid, such as petrol (gasoline). In one embodiment, the nonpolar compound is hexane.

In another embodiment, other organic contaminants may be present in either aqueous solution or as a nonpolar compound. The organic contaminant may be an herbicide, a fungicide, a pesticide, a pharmaceutical compound, a steroid, a microbial toxin, a metabolite, a disinfection byproduct, an arsenic-containing compound, a food byproduct, a dye, or some other organic molecule. Preferably the contaminant is one or more unwanted compounds known as an environmental pollutant.

In one embodiment, the mixture comprises the nonpolar compound at a volume percent concentration of 0.5-50%, preferably 2-45%, more preferably 4-35% relative to a total volume of the mixture. The nonpolar compound may be emulsified or dispersed throughout the mixture, may float at the top of the mixture, or some combination of both. In an alternative embodiment, the mixture may not contain oil or a non-polar liquid phase.

The mixture may comprise the aqueous solution at a volume percent concentration of 50-99.5%, preferably 55-98%, more preferably 65-96% relative to a total volume of the mixture.

In one embodiment, a composite material may be reused for at least 3 or 5 cycles, at least 10 cycles, or at least 15 cycles, with the weights of the nonpolar compound being adsorbed at each cycle having a relative standard deviation (RSD) of 5% or less, preferably 4% or less, more preferably 3% or less.

In some embodiments, the composite material may additionally adsorb a small amount of aqueous solution with the contacting. Preferably the composite material adsorbs less than 20%, preferably less than 10%, more preferably less than 5%, even more preferably less than 1% of its weight of the aqueous solution. In some cases, this small amount of aqueous solution adsorption may be due to areas within the composite material that have exposed polyurethane without a layer of r-GO.

In one embodiment, the method further comprises the steps of compressing or squeezing the composite material after the contacting to produce a discharged (or used) composite and a volume of nonpolar compound and reusing the discharged composite. A used composite material may also be cleaned or rinsed with solvents or other reagents before reuse. In some embodiments, a used composite material may be contacted again with the r-GO suspension and/or dried, prior to reuse. Alternatively, the used composite material may be contacted again with styrene vapor and irradiated.

In a further embodiment, the discharged composite comprises at least 90 wt %, at least 95 wt %, preferably at least 97 wt %, more preferably at least 99 wt % r-GO relative to a total weight of r-GO in the composite material. In other words, the contacting and then compressing of the composite material results in a loss of less than 5 wt %, preferably less than 3 wt %, more preferably less than 1 wt % of the initial weight of r-GO. A small or negligible loss of r-GO means that the composite material may be successfully reused multiple times, and preferably the reused composite material maintains an adsorption capacity that allows the composite to adsorb 20-50 times its weight of the nonpolar compound. However, in some embodiments, the adsorption capacity, in terms of the weight percentage of the nonpolar compound relative to a weight of the composite, may decrease by 2%, 1%, or by less than 1% with each use cycle.

In a related embodiment, the discharged composite comprises at least 90 wt %, at least 95 wt %, preferably at least 97 wt % polystyrene relative to a total weight of polystyrene in the composite material. Preferably the discharged composite here had been treated to toluene as previously mentioned in its method of making.

In one embodiment, the contacting involves filtering the mixture through the CNF grafted composite. The mixture may or may not be pre-processed, for instance, by filtering through a coarse filter to remove large particulate matter, or by exposure to UV light or ozone. Filtering the mixture through the composite material means that a portion or all of the mixture passes through one area on an external surface of the composite material (the "feed side"), and that a permeate elutes and exits from some other area of the external surface of the composite (the "permeate side"). The composite material may be attached within a vessel or within a tubing, or at the end of a vessel or at the end of a tubing. Preferably, for filtering a polar and nonpolar phase-separated mixture, the feed side touches at least the nonpolar phase.

In one embodiment, the filtering leaves a retained aqueous phase that is more than 90%, preferably more than 95%, more preferably more than 99%, even more preferably more than 99.5% of the total weight of the aqueous phase in the mixture before the contacting. The mixture may be filtered by the force of gravity, by siphoning, by pouring, or by applying suction or positive pressure.

In one embodiment of the filtering, a pressure difference across the feed side to the permeate side of the composite material is 0-5 kPa, preferably 0-4 kPa, more preferably 0-3 kPa. Here, the pressure difference may be created solely by the weight of a mixture on the feed side meaning that the filtration is gravity driven. Alternatively, the pressure difference may be created by a pump, a vacuum pump, a piston, a compressed gas, centrifugation, evaporation, or water jet aspiration. Preferably the pressure is constant, though in alternative embodiments, the pressure may be varied. In one embodiment, the nonpolar compound permeates through composite material at a flow speed of 0.5-20.0 mm/s, preferably 1.0-10.0 mm/s, more preferably 2.5-7.5 mm/s. In other embodiments, flow speeds of 20-50 mm/s or greater than 50 mm/s may be possible.

The examples below are intended to further illustrate protocols for preparing, characterizing the composite material and uses thereof, and are not intended to limit the scope of the claims.

EXAMPLE 1

Experimental
  Materials

Styrene was purchased from ALFA AESAR™. Graphite was acquired from FLUKA™. Toluene and hexane were obtained from MERCK™ and SIGMA ALDRICH™, respectively. Ethanol was obtained from BAKER ANA-LYZED® Reagent. Commercial polyurethane was purchased from a local market. Distilled water was collected from a laboratory-based distillation unit.

Instrumentation

A MICROMERITICS® TriStar II Plus instrument was used for the measurement of the surface area and the pore size of the materials. A Goniometer was used for the measurement of the contact angle. SEM images were recorded using a scanning electron microscope. The FTIR of the materials were collected using a THERMO SCIENTIFIC ® iS10 instrument. The material drying was done using a BLUE M® oven. The stirring during fabrication was done with the help of a THERMO SCIENTIFIC® magnetic stirrer.

Synthesis of Graphene

Graphene oxide (GO) was prepared using a modified Hummers method. See W. S. Hummers, et al., *J. Am. Chem. Soc.* 1859, 80, 1339. Briefly, the procedure for the synthesis of GO is as follows. In a 500 mL volumetric flask, graphite powder (5 g) was added to 100 mL of concentrated sulfuric acid ($H_2SO_4$) and 100 g of sodium nitrate ($NaNO_3$). The resulting solution was stirred for 30 minutes at 5° C. in an ice-bath. After that, potassium permanganate ($KMnO_4$) powder (15 g) was added slowly to the flask, and the mixture was heated to 35-40° C. and stirred for another 30 minutes. Distilled water (200 mL) was then added to the above mixture over a period of 25 minutes. Finally, 30% $H_2O_2$ was added to the mixture until the formation of a yellowish solid product. The mixture was then kept under stirring. The powder was separated in a centrifuge and washed several times by HCl solution and then by water. The obtained graphene oxide was then reduced by sodium.

GO was reduced by using ascorbic acid. Around 20 g of ascorbic acid was introduced to the dispersed GO under stirring at 70° C. for 4 h. The obtained material was allowed to cool and then separated in a centrifuge.

Fabrication of 3D zz-PS/GR/PU

A fine dispersion of 0.5 mg/mL graphene was prepared by sonicating the graphene in ethanol for 1 hour. After sonication, a piece of PU was dipped into the ethanol dispersed graphene. After that, it was removed from the ethanol dispersed graphene. It was dried and cured for 12 hours in an oven at 60° C. The obtained graphene coated polyurethane was described as GR/PU. After the curing process, the GR/PU was transferred into a glass reactor. The glass reactor contained 3 mL styrene monomer. In the glass reactor, the GR/PU was suspended almost in the middle to prevent it from touching the styrene liquid. Similarly, the PU without graphene coating was also prepared in another glass reactor for performance comparison. The glass reactors contained pure PU and the GR/PU was exposed to the natural sunlight until the styrene liquid disappeared. The zigzag growth of the polystyrene on the GR/PU surface was observed clearly. After the polystyrene growth, the black color of the GR/PU was changed to blackish white. The achieved architecture of the 3D zigzag polystyrene/graphene incorporated polyurethane was described as 3D zz-PS/GR/PU. The 3D tzz-PS/GR/PU was obtained by instantly dipping and then removing it from the pure toluene. After this toluene treatment, it was dried at room temperature.

Experiment for Hexane/Water Separation

The experimental setup was designed for the hexane and water separation. The glass reactor in which the 3D zz-PS/GR/PU was synthesized was made open from both ends. It was directly fixed on the opening of the suitable funnel to establish an experimental setup. The hexane and water mixture was prepared by mixing 100 mL hexane and 300 mL water in a reagent bottle. The mixture was introduced through the separation setup. For the absorption experiment, the synthesized material was dipped into hexane and taken out for weight measurement.

EXAMPLE 2

Results and Discussion
  Mechanism and Process of Trowing 3D zz-Polystyrene into GR/PU:

The synthesized hydrophobic material 3D zz-PS/GR/PU is a combination of graphene, polystyrene, and polyurethane. The incorporation of graphene into the polyurethane network provided a large surface area and also contributed to improving the mechanical properties of the material. The midway hanging of the GR/PU into the glass reactor assisted with achieving uniform growth of PS in 3D zz-PS/GR/PU. The glass reactor played a crucial role in the formation of the 3D zz-PS/GR/PU. The glass reactor walls were transparent and permitted the sunlight radiation to enter the reactor through it. The synthesis process of 3D zz-PS/GR/PU was completed in two-steps. The styrene liquid cannot approach directly to the GR/PU because it is hanging midway in the middle of the reactor. The sunlight radiation entered into the transparent glass reactor which provided the heat to vaporize the volatile styrene and might also have established an equilibrium between the styrene vapors and the liquid styrene in the reactor. Vapors can move freely in the free space of the reactor and some of them stayed and passed through the porous network of the GR/PU. Simultaneously, the second step of polymerization was started. During this step, the polymerization process of styrene was initiated by the natural light. In this polymerization step, the styrene vapors started to convert into polystyrene and further stimulated the styrene liquid to vaporize. This process was continued until the polymerization process was completed. FIG. 1 shows the two-step, sunlight initiated vaporization and polymerization of styrene.

Figure 2:
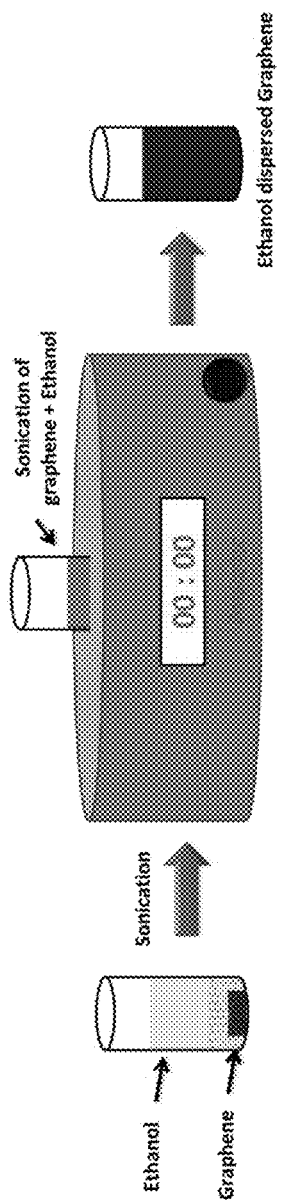
FIG. 2 is a schematic representation of the fabrication of 3D zz-PS/GR/PU for oil and water separation.
Figure 2:
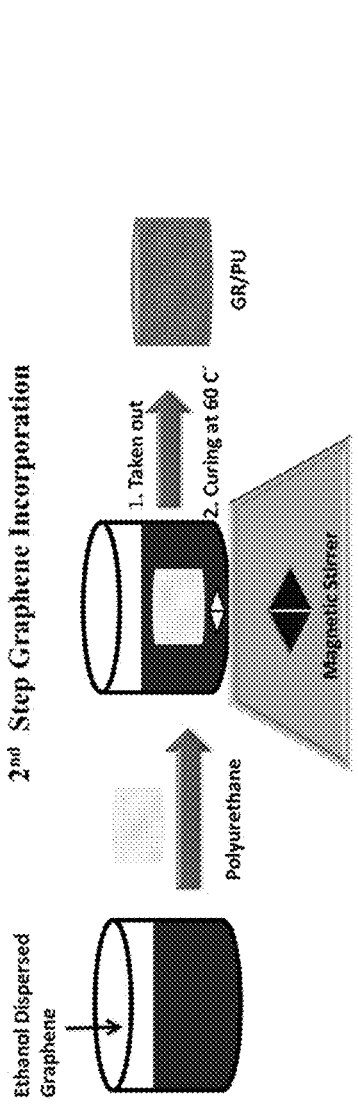
Figure 2:
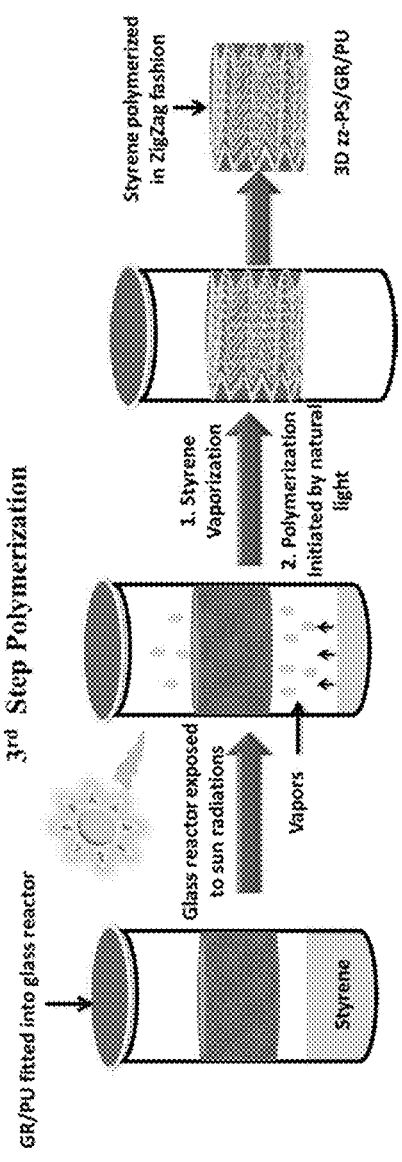

The critical observation was made, after the polymerization of polystyrene on the pure polyurethane, that the interior of the PS/PU became fragile. It was shattered into small particles by touching its surface. However, the incorporation of graphene into PU enhanced the growth of the polystyrene and the surface was more mechanically stable. The growth of polystyrene from the vapors of styrene is more interesting and provided a particular zigzag pattern of polystyrene which was porous in nature. This methodology might provide a better opportunity to combine the intrinsic characteristics of the polyurethane, graphene, and polystyrene for efficient utilization in various targeted fields. The fabrication process for the 3D macro zigzag architecture of graphene reinforced polystyrene is illustrated in FIG. 2.

Figure 3A:
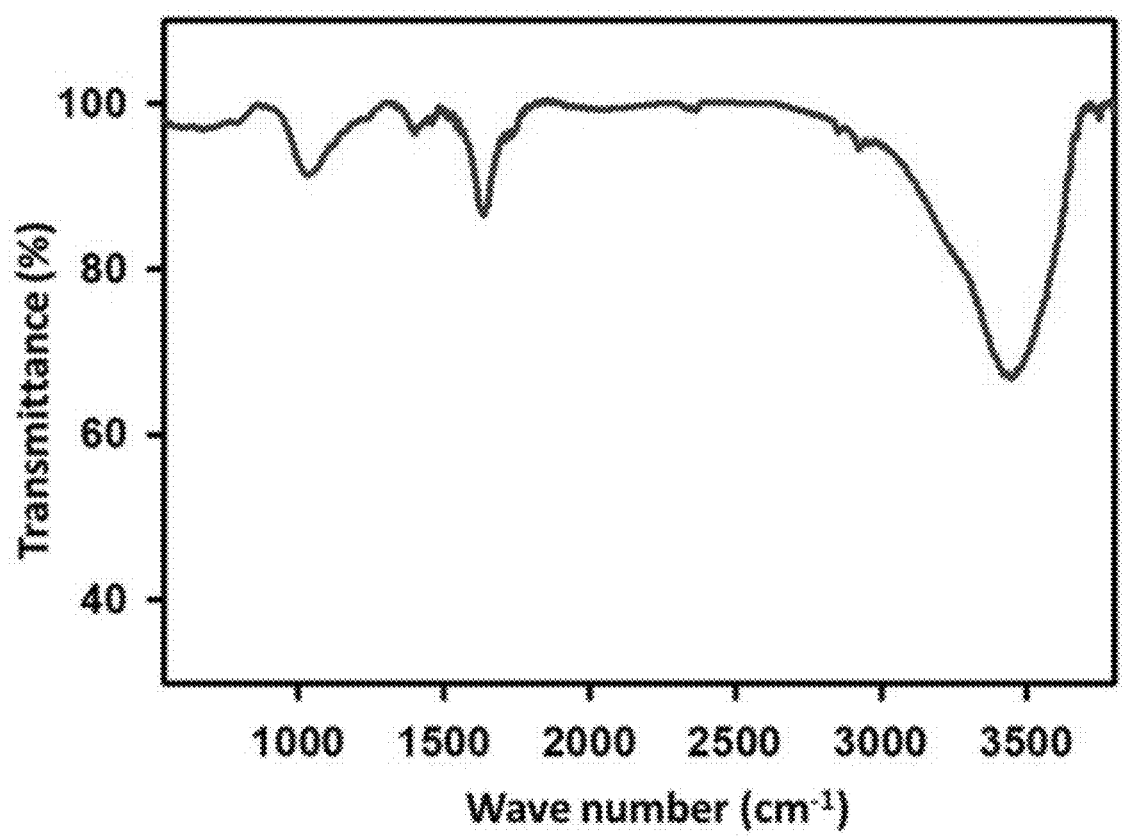
FIG. 3A is a FTIR spectrum of graphene.
Figure 3B:
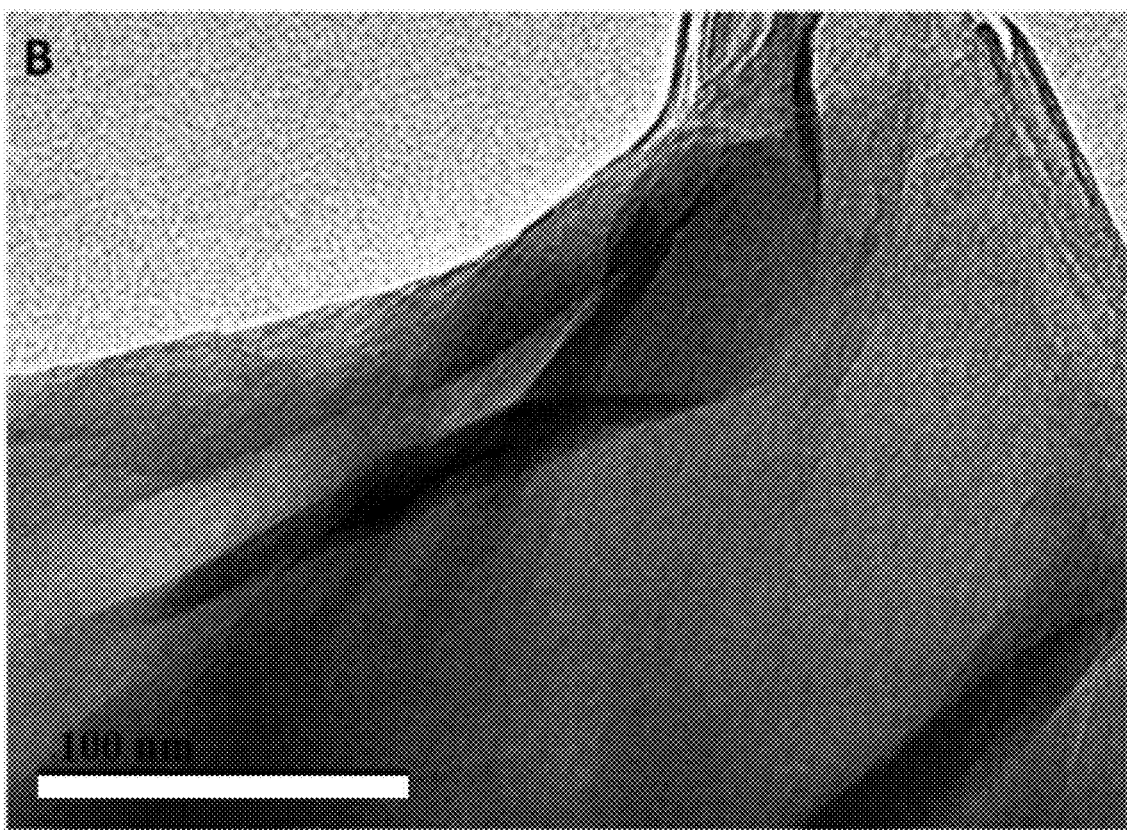
FIG. 3B is a TEM image of graphene, scale bar 100 nm.

Surface Morphology and FTIR Study of the Materials:

The synthesized materials were characterized by transmission electron microscopy (TEM), scanning electron microscope (SEM) and Fourier transfer infrared spectroscopy (FTIR). The synthesized graphene was characterized by the FTIR and the TEM. The FTIR spectra have shown the characteristic absorption peak of aromatic carbon-carbon double bond (—C=C—) at 1633 $cm^{-1}$. During the reduction process of graphene oxide, some oxygen-containing functionalities were retained which generally appeared in the FTIR spectra of the reduced graphene oxide. The absorption peaks of oxygen-containing functionalities such as carboxy —C—O stretching ($v=1391$ $cm^{-1}$), alkoxy —C—O stretching ($v=1027$ $cm^{-1}$), and hydroxyl group ($v=3438$ $cm^{-1}$) absorption peaks appeared in the FTIR spectra of graphene. The TEM study revealed either one or only a few layered graphene. The FTIR and the TEM study have shown that graphene was successfully synthesized (FIGS. 3A and 3B). The SEM images of the pure PU, PS/PU, and the 3D zz-PS/GR/PU were recorded at different magnifications to observe the morphological changes on the surface of the materials. The growth of the polystyrene on the surface of the pure PU and GR/PU was seen clearly. The wrinkled shaped graphene was observed in the 3D zz-PS/GR/PU which was responsible for huge surface area and the mechanical strength of the synthesized material (FIGS. 4A-4F).

The pure polyurethane FTIR spectra (FIG. 5) displayed its characteristics peaks. See S. Vlad, et al., *e-Polymers* 2009, 9, 1. The vibrational absorption band appeared at 3225-3404 $cm^{-1}$ and 1541 $cm^{-1}$ was assigned to —N—H stretching and —N—H deforming, respectively. The —$CH_2$ symmetric and asymmetric stretching vibrational peaks appeared at 2866 and 2970 $cm^{-1}$, respectively. The absorption peak appeared at 1450 $cm^{-1}$ and was assigned to the —$CH_2$ bending vibration band. The peak which appeared at 1714 $cm^{-1}$ in the spectra was assigned to the C=O vibrational peak. In the FTIR spectra of the polyurethane, the asymmetric stretching vibrational peak of the NCO at 2270 $cm^{-1}$ was absent. The absence of the absorption peak at 2270 $cm^{-1}$ revealed that after polymerization there were no free NCO functionalities. See Y. Peng, et al., *New J. Chem.* 2013, 37, 729; and H. B. Liu, et al., *Key Eng. Mater.* 2016, 703, 273.

A strong absorption peak was seen in the polyurethane spectra at 1097 $cm^{-1}$ which was assigned to the stretching of C—O—C.

Figure 5:
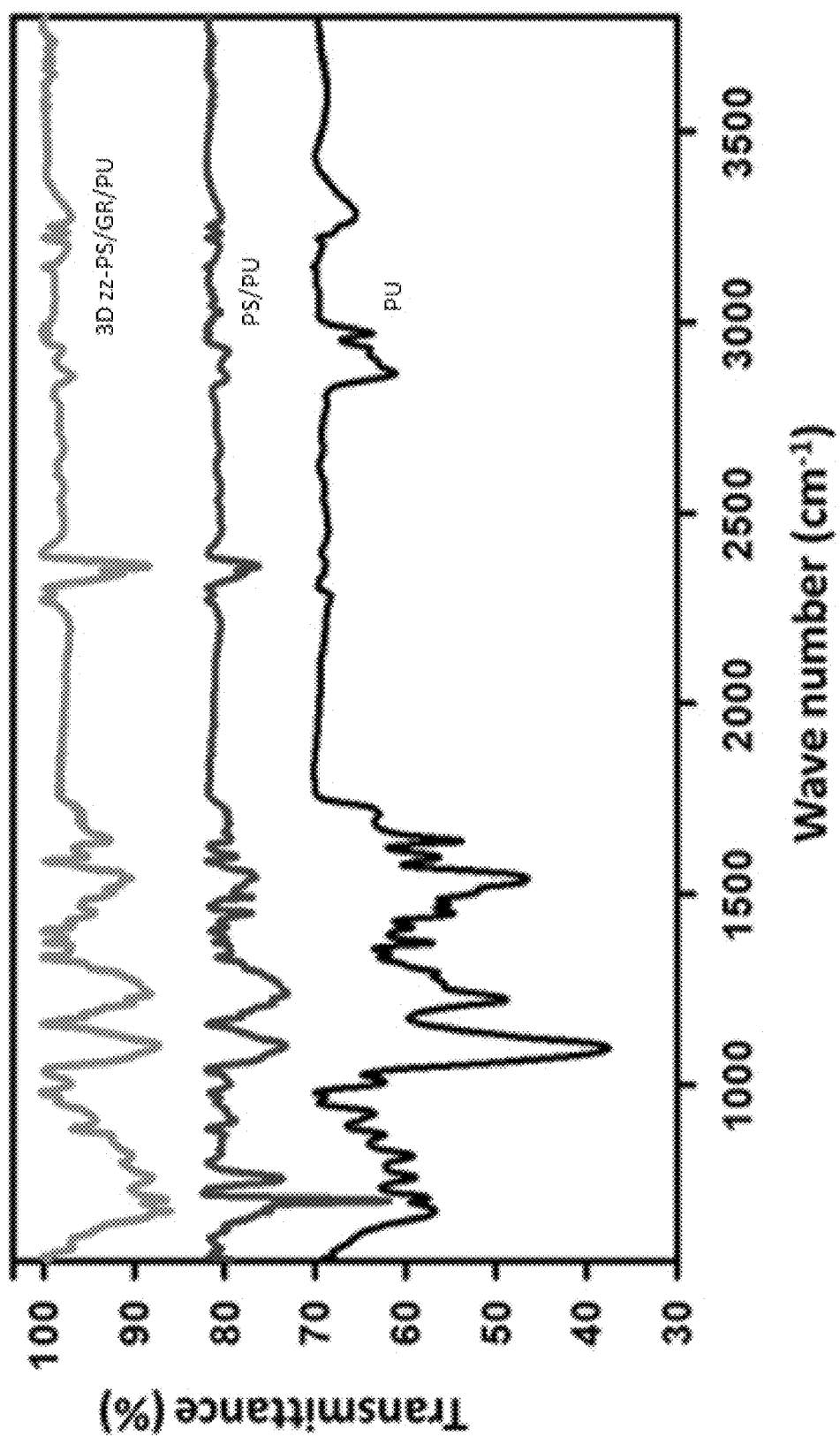
FIG. 5 shows FTIR spectra of PU, PS/PU, and 3D zz-PS/GR/PU.

The introduction of polystyrene and graphene into the polyurethane brought some obvious changes into the FTIR spectra, however, the basic structure of the polyurethane was retained in the composite 3D zz-PS/GR/PU (FIG. 5C). A substantial decrease in the peak intensity of the C—O—C was seen after the incorporation of graphene and the styrene polymerization. It was shifted substantially from 1097 (PS/PU) to 1103 $cm^{-1}$ (3D zz-PS/GR/PU). This interaction of the PU surface with the graphene and the polystyrene might be responsible for the change in the C—O—C peak intensity and peak position. Apart from this, peak shifts in the absorption peaks of the other functionalities were also observed. A red shift in the —$CH_2$ symmetric and asymmetric peak of the PS/GR/PU was observed as the peaks shifted from 2866 to 2859 $cm^{-1}$ and 2970 to 2927 $cm^{-1}$, respectively. A blue shift in the —N—H deforming peak was observed and it was shifted from 1541 to 1542 $cm^{-1}$. The carbonyl peak that appeared in the pure polyurethane became considerably unclear in the PS/PU and PS/GR/PU FTIR spectra (FIG. 5).

Figure 6A:
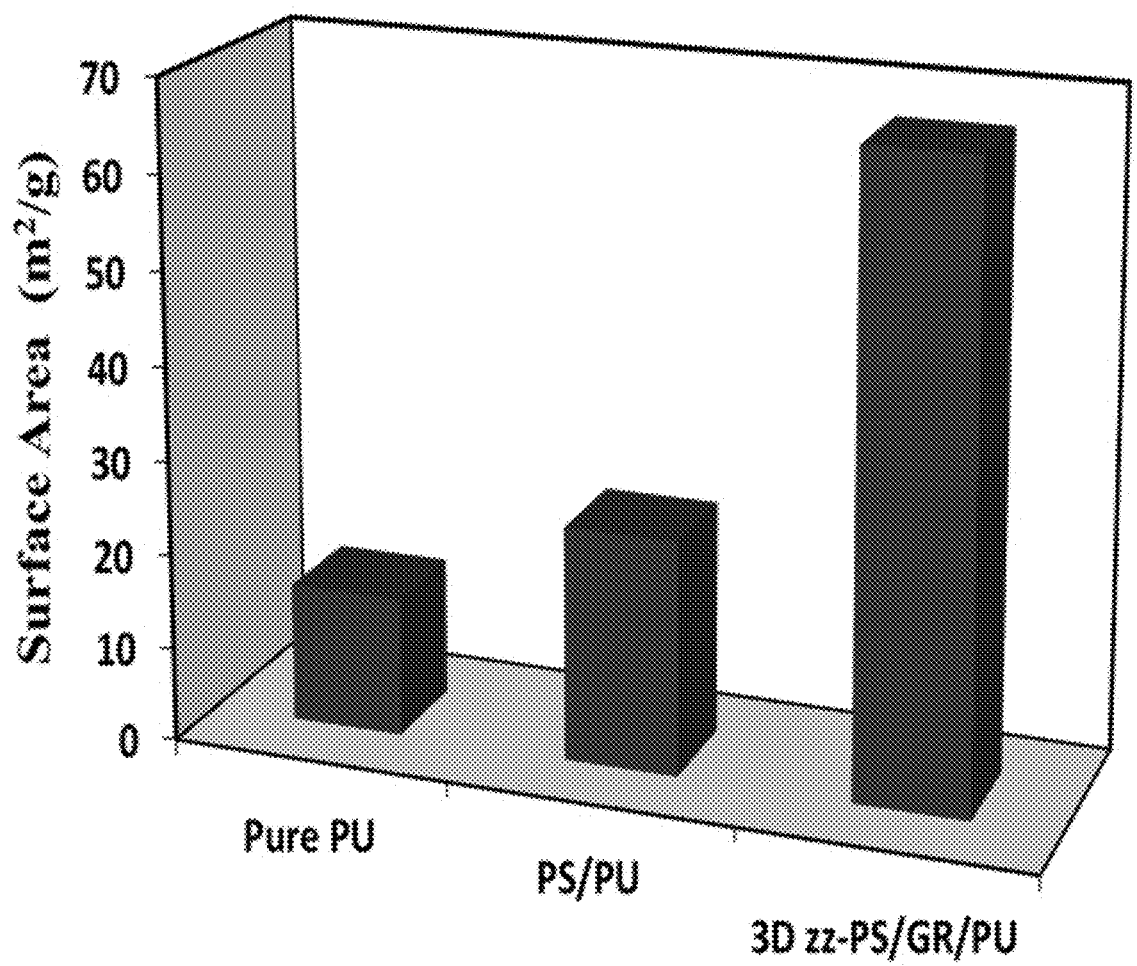
FIG. 6A shows the BET surface areas of PU, PS/PU, and 3D zz-PS/GR/PU.
Figure 6B:
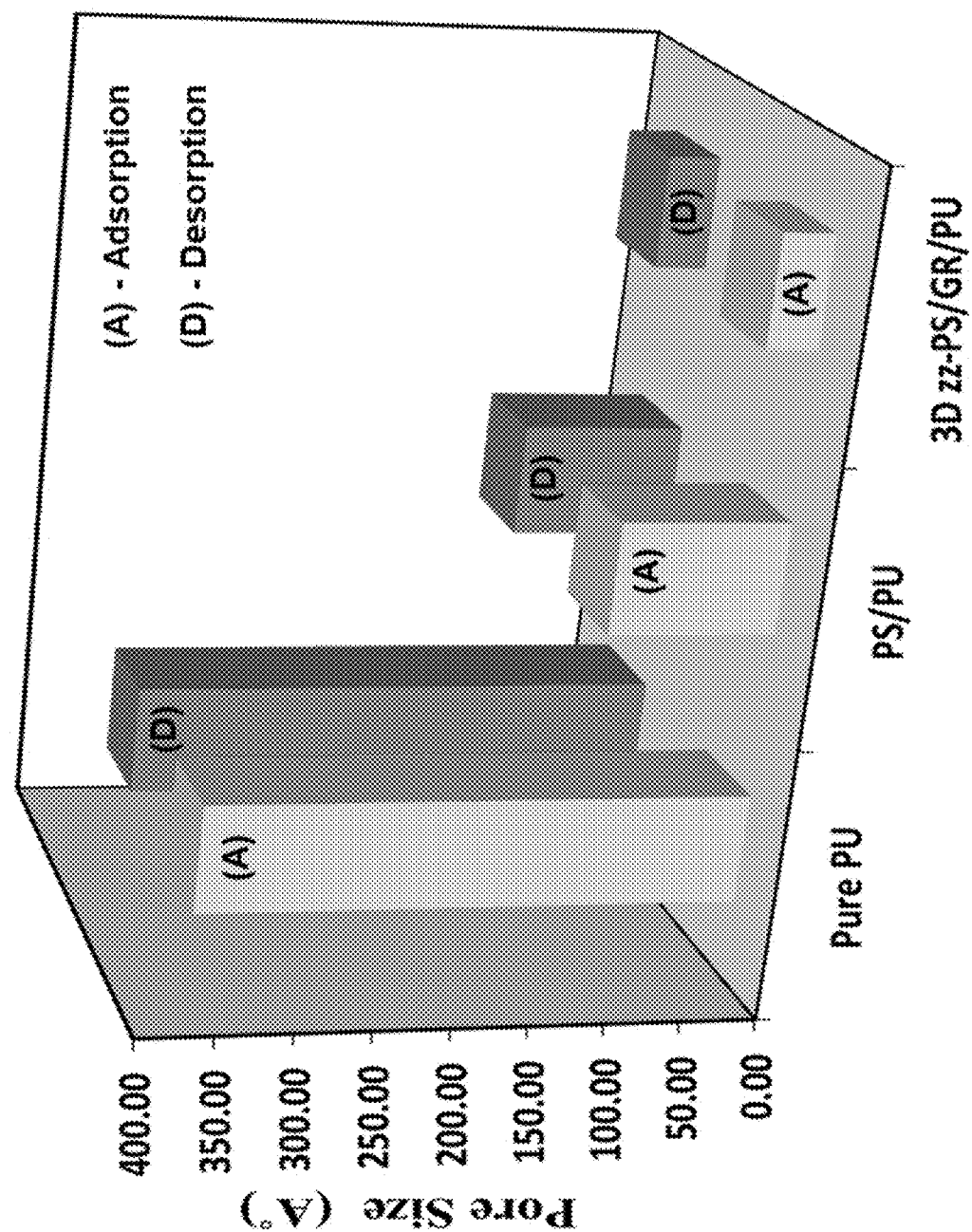
FIG. 6B shows the adsorption and desorption pore sizes of PU, PS/PU, and 3D zz-PS/GR/PU.

Surface Area and Pore Size Evaluation of 3D zz-PS/GR/PU:

The utilization of nanomaterials in the synthesis of various composites can bring some extraordinary properties into the material. It is evident that nanomaterials such as graphene have a substantial effect on the surface area of the material. See N. Baig, A. Kawde, *RSC Adv.* 2016, 6, 80756. In the absence of graphene, the pure PU surface area was found to be 15 $m^2/g$. The graphene incorporated 3D zz-PS/GR/PU showed substantial incremental growth in the surface area which increased from 15 to 67 $m^2/g$ (FIG. 6A). The graphene and polystyrene also made a great impact on the pore size of the material. The adsorption and desorption pore size of the pure PU was found to be 354 and 352 Å, respectively. After the graphene and polystyrene incorporation, the 3D zz-PS/GR/PU pore size was substantially decreased to 34 and 33 Å (FIG. 6B). The incremental growth in surface area and the decrease in the pore size revealed that there might be new pores and surfaces generated in the 3D zz-PS/GR/PU which were responsible for the surface area improvement. Furthermore, the decrease in pore size provided better channels with superhydrophobicity for the efficient separation of oil and water.

Surface Hydrophobicity

The synthesized 3D zz-PS/GR/PU hydrophobicity and the oleophilicity were evaluated with the mixture of water and hexane. Both liquids are naturally colorless and methylene blue colored water was used to differentiate between the water and hexane. The growth of the polystyrene is evidently observed from the upper view of the glass reactor (FIG. 7A). In the start of the reaction process, the styrene liquid was at the bottom of the glass reactor and therefore had no chance to come into direct contact with the GR/PU. The synthesis of the polystyrene on the upper side of the 3D zz-PS/GR/PU was a clear indication that vapors of the styrene was passing easily through the GR/PU. The passage of vapors all-around the GR/PU was also evident from the side-wise growth of the polystyrene (FIG. 7C). After some detailed and comprehensive investigation of the surface, it was revealed that there was some sort of pattern in the growth of the polystyrene. This pattern of polystyrene was spread all over the 3D composite. These well-organized patterns appeared in a zigzag arrangement (FIG. 7E). This sort of arrangement exposed more surface area and may provide some sort of hollow arrangement which allowed the rapid passage of the non-polar component. The synthesized composite 3D zz-PS/GR/PU is superhydrophobic in nature and it can be seen in FIG. 7B where the methylene blue colored drop of water was fully retained by the surface. The drop of water became entirely circular on the 3D zz-PS/GR/PU surface due to the superhydrophobic nature of the surface which did not allow the water to make a significant contact with the surface in order to pass. All sides of the zz-PS/GR/PU were scanned to observe its behavior towards the water. This study has revealed that all sides of the zz-PS/GR/PU were superhydrophobic and did not allow the water to spread or pass through it (FIG. 7B-7C).

Figure 8:
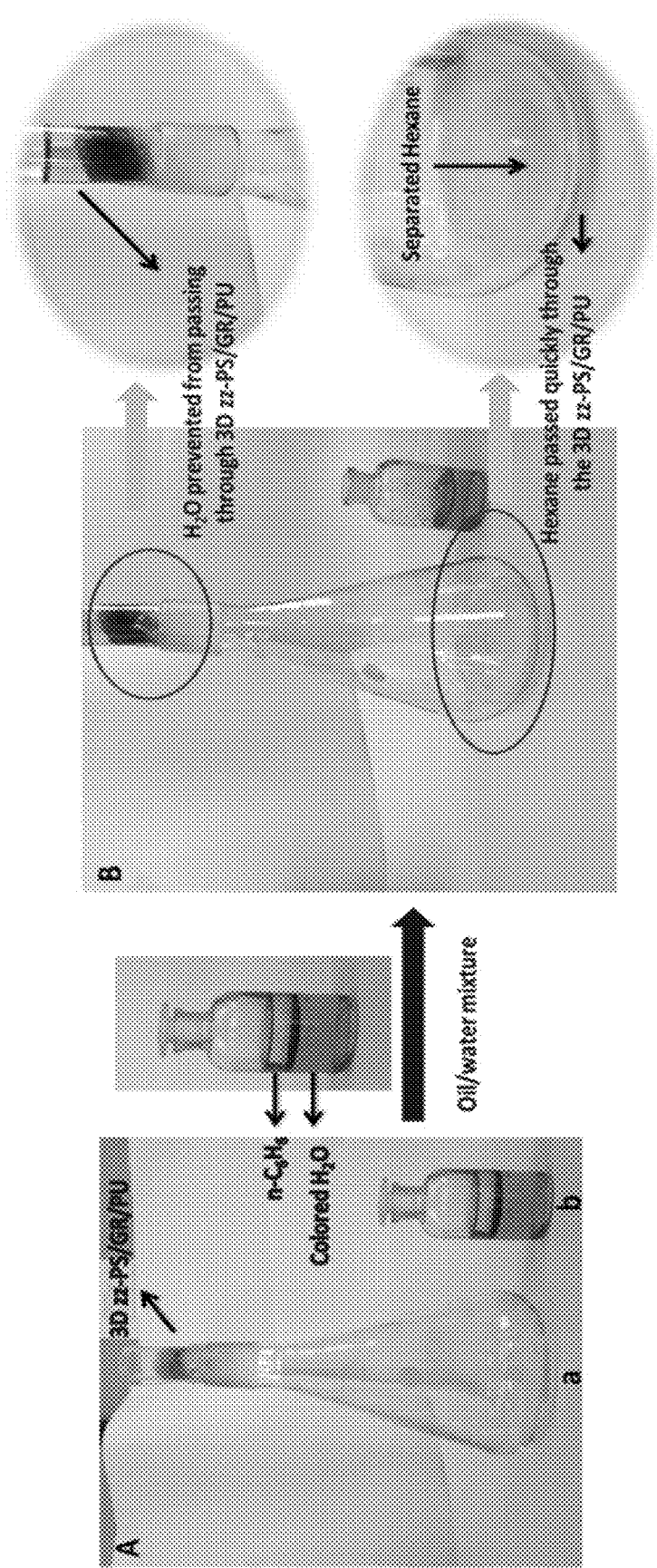
FIG. 8 illustrates the separation of oil and water. A column packed with 3D zz-PS/GR/PU composite is inserted into the neck of a flask (a). A mixture (b) of hexane and methylene-blue colored water is poured into the column, and the colored water is retained while the hexane quickly passes through the 3D zz-PS/GR/PU.

The established 3D hydrophobic architecture was investigated for its efficiency to separate the oil from water. The separation setup used can be seen in A of FIG. 8. The water and hexane mixture was added from the upper part of the oil/water separation setup which contained the 3D zz-PS/GR/PU in its upper part. Amazingly the 3D zz-PS/GR/PU exhibited both superhydrophobic and superoleophilic behavior. The hexane was allowed to pass quickly simply under the force of gravity without applying any external force, while the methylene blue colored water was not permitted to pass through the 3D zz-PS/GR/PU. The separation of hexane and water was seen in the separating setup (B of FIG. 8) where the upper part of the glass reactor contained the methylene blue colored water while the hexane passed through it.

The synthesized 3D zz-PS/GR/PU composite was not compressible and appeared hard in nature. Due to its non-compressible nature, it exhibited a hard tube like capillary behavior which allows for the rapid gravity-driven passage of hexane. Due to its non-compressible nature, it could not keep a large quantity of the hexane although it still possessed the absorption capability of the non-polar organic solvents. The weight gain ratio of the 3D zz-PS/GR/PU for hexane was found to be 890%. This is an indication that it could take a good quantity of hexane apart from its compact nature. The absorbed hexane can be released simply by shaking the 3D-PS/GR/PU due to its weak holding capacity. The synthesized material has long-term stability and it can be used multiple times without compromising its efficiency for hexane and water separation. It can be shown to be a valuable superhydrophobic material for the bulk separation of oil and water due to the rapid passage of oil through it.

Figure 9:
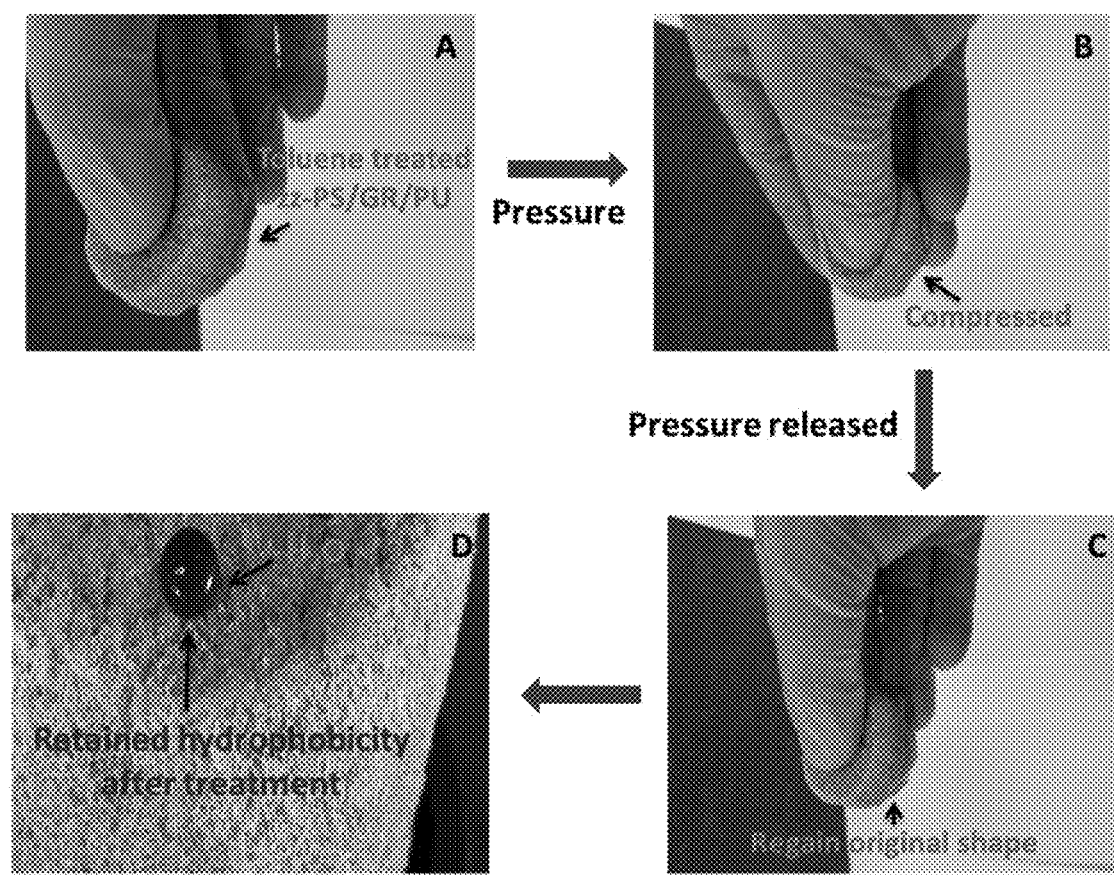
FIG. 9 is a flow chart showing the reusability of the zz-PS/GR/PU where toluene treated zz-PS/GR/PU (tzz-PS/GR/PU) (A) is fully compressed (B), then released (C), and still retains superhydrophobicity (D).
Figure 10:
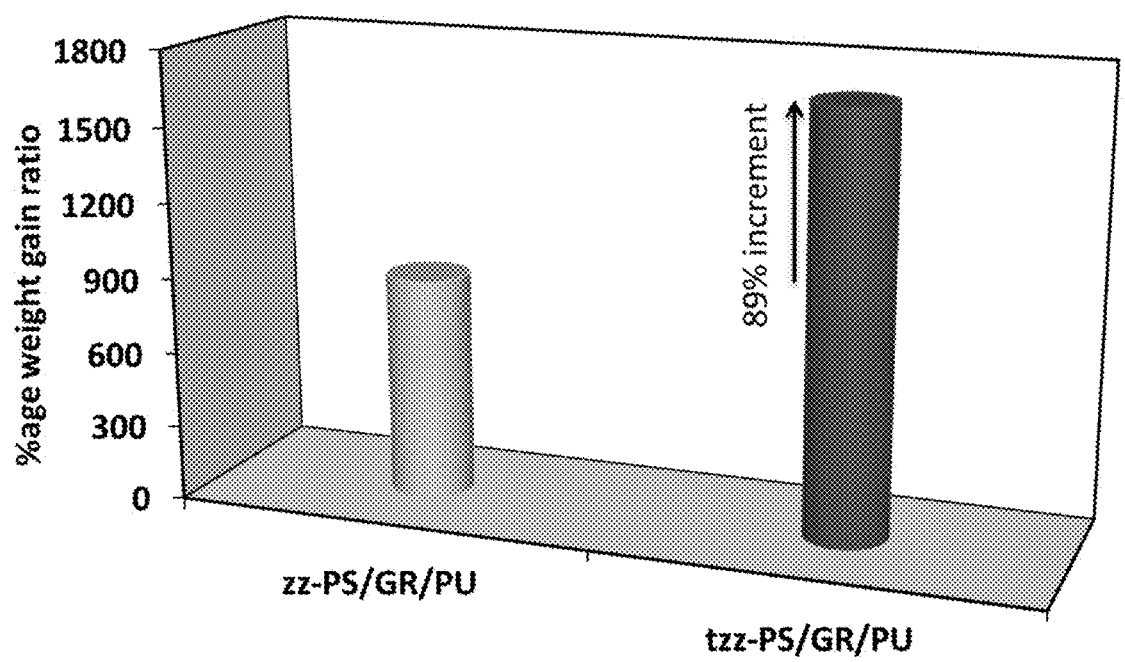
FIG. 10 is a graph showing the weight gain capacity of the zz-PS/GR/PU and tzz-PS/GR/PU.

Toluene Treated 3D zz-PS/GR/PU:

As mentioned previously, the zz-PS/GR/PU has a compact and stiff surface which provides tube-like channels and allows for the rapid passage of the hexane through it. These channels were hydrophobic enough to prevent water from passing. Polystyrene showed some solubility in the toulene. See M. T. Garcia, et al., Waste Manag. 2009, 29, 1814. This interaction of the polystyrene and the toluene was used as a tool to produce the compressable 3D tzz-PS/GR/PU. The toluene treatment showed some change in the weight of the material. The weight of the 3D tzz-PS/GR/PU was found to be 8.47% less compared to 3D zz-PS/GR/PU. This change in weight indicates that some of the polystyrenes dissolved into toluene which broke the continuous structure which imparted the compressible behaviour to the material. The compressible nature of the 3D tzz-PS/GR/PU is shown in FIG. 9, and it can be fully pressed between the fingers. After releasing the pressure, it regained its original shape (FIG. 9). This treatment might have some affect on the hydrophobic behavior of the 3D composite. For this reason, the hydrophobic behaviour of the 3D tzz-PS/GR/PU was investigated using methylene blue colored water. It did not allow the water to pass and the water droplet maintained same circular shape on the 3D tzz-PS/GR/PU. The polystyrene on the surface somehow became fluffy (D of FIG. 9). Its capability to absorb hexane was significantly improved and the percent weight gain ratio of the 3D tzz-PS/GR/PU was improved to 89% compared with 3D zz-PS/GR/PU (FIG. 10). The absorbed hexane is released from 3D tZZ-PS/GR/PU by squeezing. The comparison of the synthesized hydrophobic material was shown to be either comparable or superior in efficiency to the reported hydrophobic materials in table 1.

TABLE 1

Comparison of the syntheized hydrophobic materials with other reported hydrophobic material for hexane absorption.

| Sr# | Adsorbent | BET surface area ($m^2/g$) | Hexane (g/g) | Recycling | Ref. |
|---|---|---|---|---|---|
| 1 | Hydrophobic CNF aerogels | 18.4 | 24 | Evaporation | (a) |
| 2 | multi-functional carbon fiber | — | 22 | Distillation, Combustion, Squeezing | (b) |
| 3 | Polydopamine/chitosan/ reduced graphene oxide composite aerogel | 51.76 | 12 | Squeezing, Heating | (c) |
| 4 | Cupric stearate/sponges | — | 22.63 | | (d) |
| 5 | Swellable porous PDMS/MWNTs | — | 15.05 | squeezing | (e) |
| 6 | Graphene aerogels | 100-350 | 25 | — | (f) |
| 7 | CNT/PDMS-coated PU sponge | | 15 | | (g) |
| 8 | MTMS-DMDMS gels | — | 6 | squeezing | (h) |
| 9 | 3D zz-PS/GR/PU | 67 | 9 | Evaporation, Shaking, | This work |
| 10 | 3D tzz-PS/GR/PU | — | 17 | Squeezing, Evaporation | This work |

See (a) A. Mulyadi, et al., ACS Appl. Mater. Interfaces 2016, 8, 2732; (b) S. Yang, et al., RSC Adv. 2015, 5, 38470; (c) N. Cao, et al., Chem. Eng. J. 2017, 326, 17; (d) Z. Liu, et al., RSC Adv. 2016, 6, 88001; (e) A. Turco, et al., J. Mater. Chem. A 2015, 3, 17685; (f) J. Wang, et al., J. Mater. Chem. 2012, 22, 22459; (g) C.-F. Wang, et al., ACS Appl. Mater. Interfaces 2013, 5, 8861; and (h) G. Hayase, et al., Angew. Chemie Int. Ed 2013, 52, 1986.

Overall, a cost-effective method was introduced for the fabrication of superhydrophobic 3D zz-PS/GR/PU material. The 3D superhydrophobic architecture was accomplished by initiating the polymerization of styrene with the help of natural sunlight containing graphene and polyurethane in a confined glass reactor. The polymerization process produced a well-decorated pseudo zigzag arranged polystyrene pattern on the GR/PU. The incorporation of graphene into PU provided a huge surface area and also mechanical stability to the material. In the graphene incorporated PU, the polystyrene patterns and growth were more prominent compared to pure PU. This might be due to the better surface area and the catalytic effect of the graphene. The 3D zz-PS/GR/PU provided the compact porous superhydrophobic channels for the rapid gravity driven separation of oil and water, whereas the 3D tzz-PS/GR/PU is a compressible material with a high absorbing capability for hexane. The 3D zz-PS/GR/PU and 3D tzz-PS/GR/PU showed a hexane absorption capacity of 9 and 17 g/g, respectively. The 3D zz-PS/GR/PU displayed a high surface area of 67 $m^2/g$ with a small adsorption and desorption pore size of 34 and 33 Å, respectively. The water contact angle displayed by the 3D zz-PS/GR/PU was approximately 150°. In separated hexane apparently, no water was found and it had an almost 100% capacity to separate hexane from water. This route of formation can provide a cost-effective approach to produce a hydrophobic material on a large scale which is generally a challenging task, especially on a laboratory scale. The developed methodology of synthesis is exceedingly robust and reproducible. It may encourage researchers to look for other polymers and nanomaterials for the fabrication of a 3D porous architecture for very demanding applications in the fields of energy, oil/water, supercapacitors, and sensors.

The invention claimed is:

1. A composite material, comprising:
a polyurethane foam comprising an open-cell structure having an exterior surface and containing pores having an interior pore surface;
a coating layer of reduced graphene oxide (r-GO) on at least 70% of a total of the exterior surface and interior pore surface and in contact with the polyurethane foam; and
a layer of polystyrene in contact with both the surface of the layer of r-GO and directly in contact with the surface of the polyurethane foam,
wherein
an average thickness of the polystyrene layer is from 500 nm to 4.5 μm, and
the composite material has pore diameters in a range of 50-500 μm.

2. The composite material of claim 1, wherein an apparent contact angle of the composite material with water is 130°-170°.

3. The composite material of claim 1, having a BET surface area in a. range of 50-100 $m^2/g$.

4. The composite material of claim 1, wherein the r-GO layer comprises nanoplatelets having a thickness of from 40 nm to 110 nm, diameters of from 5 μn to 45 μm and a length to thickness aspect ratio of from 40:1 to 1,200:1.

5. The composite material of claim 1, wherein the r-GO layer comprises carbon nanotubes at a weight percentage of from 5 wt % to 80 wt % relative to a total weight of the r-GO.

6. The composite material of claim 1, wherein the polystyrene is covalently bonded to the r-GO.

* * * * *